US011799969B2

(12) United States Patent
Morkovine et al.

(10) Patent No.: US 11,799,969 B2
(45) Date of Patent: *Oct. 24, 2023

(54) FORMING ACTIVITY STREAMS ACROSS HETEROGENEOUS APPLICATIONS

(71) Applicant: Box, Inc., Redwood City, CA (US)

(72) Inventors: Daniel Wayne Morkovine, San Carlos, CA (US); Michelle Sangeun Oh, San Francisco, CA (US); Faizan N. Buzdar, Redwood City, CA (US); Derrik R. Lansing, North Ogden, UT (US); Christopher Tucker, San Francisco, CA (US); Victoria Wee, Coquitlam (CA); Prachi Subhash Jadhav, Emerald Hills, CA (US); Dhiraj Sekhri, Santa Clara, CA (US); Pal Ramanathan, Foster City, CA (US)

(73) Assignee: Box, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,677

(22) Filed: Aug. 1, 2022

(65) Prior Publication Data

US 2023/0024182 A1 Jan. 26, 2023

Related U.S. Application Data

(63) Continuation of application No. 16/552,993, filed on Aug. 27, 2019, now Pat. No. 11,405,468.
(Continued)

(51) Int. Cl.
*H04L 67/141* (2022.01)
*G06F 21/62* (2013.01)
(Continued)

(52) U.S. Cl.
CPC ............ *H04L 67/141* (2013.01); *G06F 9/451* (2018.02); *G06F 16/9535* (2019.01);
(Continued)

(58) Field of Classification Search
CPC ............... H04L 67/141; H04L 65/1083; H04L 65/4015; H04L 65/403; H04L 67/535;
(Continued)

(56) References Cited

U.S. PATENT DOCUMENTS 7,640,506 B2 * 12/2009 Pratley ................... G06Q 10/10
715/751
7,665,098 B2 2/2010 Kavalam
(Continued)

FOREIGN PATENT DOCUMENTS

CN 101 404 696 A 4/2009

OTHER PUBLICATIONS

Non-final Office Action dated Jun. 23, 2020 for U.S. Appl. No. 16/552,993.
(Continued)

*Primary Examiner* — Ramy M Osman
(74) *Attorney, Agent, or Firm* — Vista IP Law Group, LLP

(57) ABSTRACT

A user interface is configured to present a stream of activities that arise from operation of two or more heterogeneous applications that access shared content objects of a content management system. A first application of a first type among the heterogeneous applications interoperates with a second application of a second type. Application activity records that correspond to interactions by the second application over the shared content objects are stored. Additional interactions that are raised by the first application and that pertain to a common content object are also stored. When a user requests access to a content object of the content manage-
(Continued)

ment system, recent application activity records are selected. Some of the selected activity records are filtered out based on permissions attributes corresponding to the content object and/or based on permissions attributes corresponding to the requesting user. An application activity stream is generated based on the selected application activity records.

17 Claims, 13 Drawing Sheets

Related U.S. Application Data

(60) Provisional application No. 62/723,336, filed on Aug. 27, 2018.

(51) Int. Cl.
| | |
|---|---|
| G06F 9/451 | (2018.01) |
| H04L 65/403 | (2022.01) |
| G06F 16/955 | (2019.01) |
| G06F 16/9535 | (2019.01) |
| G06F 16/9536 | (2019.01) |
| H04L 65/401 | (2022.01) |
| H04L 65/1083 | (2022.01) |
| H04L 67/50 | (2022.01) |
| H04L 67/10 | (2022.01) |

(52) U.S. Cl.
CPC ...... *G06F 16/9536* (2019.01); *G06F 16/9558* (2019.01); *G06F 21/629* (2013.01); *H04L 65/1083* (2013.01); *H04L 65/403* (2013.01); *H04L 65/4015* (2013.01); *H04L 67/535* (2022.05); *H04L 67/10* (2013.01)

(58) Field of Classification Search
CPC ..... H04L 67/10; H04L 65/612; H04L 65/762; H04L 67/125; H04L 67/53; H04L 65/1069; G06F 9/451; G06F 16/9535; G06F 16/9536; G06F 16/9558; G06F 21/629; G06Q 10/10; G06Q 10/103
See application file for complete search history.

(56) References Cited

U.S. PATENT DOCUMENTS

| | | | |
|---|---|---|---|
| 8,468,164 | B1 | 6/2013 | Paleja et al. |
| 8,484,292 | B2 | 7/2013 | Spataro |
| 8,838,956 | B2* | 9/2014 | Bettger ................. H04L 63/104 713/150 |
| 9,148,425 | B2* | 9/2015 | Rowe ................... H04L 63/0869 |
| 9,489,695 | B1 | 11/2016 | Branson |
| 9,756,094 | B1 | 9/2017 | Lewis |
| 10,474,416 | B1 | 11/2019 | Farivar |
| 10,509,850 | B2 | 12/2019 | Abrahami |
| 10,693,748 | B2 | 6/2020 | Doggett et al. |
| 10,740,297 | B2 | 8/2020 | Knotts et al. |
| 10,846,470 | B2 | 11/2020 | Nguyen et al. |
| 11,405,468 | B2* | 8/2022 | Morkovine ............. H04L 67/53 |
| 11,537,623 | B2 | 12/2022 | Gao et al. |
| 11,558,191 | B2 | 1/2023 | Luce et al. |
| 11,562,170 | B2 | 1/2023 | Edge et al. |
| 11,582,292 | B2 | 2/2023 | Brewer |
| 2002/0082998 | A1* | 6/2002 | Sastri ..................... G06Q 30/06 705/51 |
| 2002/0091560 | A1 | 7/2002 | Suzuki |
| 2004/0267877 | A1 | 12/2004 | Shapiro |
| 2006/0053380 | A1 | 3/2006 | Spataro |
| 2006/0101022 | A1* | 5/2006 | Yu ......................... G06Q 10/10 |
| 2007/0050449 | A1 | 3/2007 | Beck |
| 2008/0052358 | A1* | 2/2008 | Beaven ............... G06Q 10/0633 709/205 |
| 2008/0235277 | A1 | 9/2008 | Mathew |
| 2012/0101966 | A1 | 4/2012 | Van et al. |
| 2012/0173346 | A1 | 7/2012 | Steelberg et al. |
| 2012/0192055 | A1 | 7/2012 | Antebi et al. |
| 2013/0073568 | A1 | 3/2013 | Federov et al. |
| 2013/0318627 | A1 | 11/2013 | Lundkvist |
| 2014/0236649 | A1 | 8/2014 | Hamid et al. |
| 2015/0382039 | A1* | 12/2015 | Lewis ................ H04N 21/4788 725/28 |
| 2016/0148157 | A1* | 5/2016 | Walia ...................... H04L 67/10 705/300 |
| 2016/0188733 | A1 | 6/2016 | Glover |
| 2016/0216947 | A1 | 7/2016 | Hassibi et al. |
| 2017/0048285 | A1 | 2/2017 | Paleja et al. |
| 2017/0323325 | A1 | 11/2017 | Hamedi |
| 2017/0329466 | A1 | 11/2017 | Krenkler et al. |
| 2017/0329468 | A1 | 11/2017 | Schon et al. |
| 2017/0351388 | A1 | 12/2017 | Grunewald et al. |
| 2018/0139294 | A1 | 5/2018 | Ju et al. |
| 2018/0373575 | A1 | 12/2018 | Chen |
| 2019/0026663 | A1* | 1/2019 | Homeyer ........... G06Q 10/0633 |
| 2019/0036981 | A1 | 1/2019 | Thippesh |
| 2019/0108044 | A1* | 4/2019 | Coven .................... H04L 67/10 |
| 2019/0108418 | A1 | 4/2019 | Coven et al. |
| 2019/0236547 | A1 | 8/2019 | Huang |
| 2019/0238619 | A1 | 8/2019 | Mantrana-Exposito |
| 2020/0065343 | A1 | 2/2020 | Morkovine |
| 2020/0068026 | A1 | 2/2020 | Morkovine |
| 2020/0134518 | A1 | 4/2020 | Bakshi |
| 2021/0120053 | A1* | 4/2021 | Shin .................... H04L 67/1068 |
| 2022/0141265 | A1* | 5/2022 | Leland ................ H04L 65/4015 709/204 |
| 2023/0024182 | A1* | 1/2023 | Morkovine ........... H04L 65/403 |

OTHER PUBLICATIONS

Notice of Allowance dated Dec. 7, 2020 for U.S. Appl. No. 16/552,993.

International Search Report and Written Opinion dated Dec. 18, 2019 for PCT Appln. No. PCT/US19/48436.

"Activity stream", Wikipedia, URL:"https://en.wikipedia.org/wiki/Activity_stream", Feb. 2018.

"Dropbox and Slack: removing friction from workplace collaboration", Slack.com, URL:"https://slack.com/blog/collaboration/dropbox-and-slack-removing-friction-from-workplace-collaboration", Jul. 25, 2019.

"Gsuite Updates: View your Slack activity from within Google Drive", G Suite Updates Blog, URL:https://workspaceupdates.googleblog.com/2018/01/view-your-slack-activity-from-within.html, Jan. 31, 2018.

"Meet the new Dropbox", Dropbox Team, URL:https://blog.dropbox.com/topics/product-tips/new-dropbox, Jun. 11, 2019.

Tata, Sandeep, et al. "Quick access: building a smart experience for Google drive." Proceedings of the 23rd ACM SIGKDD International Conference on Knowledge Discovery and Data Mining. 2017.

Non-final Office Action dated Mar. 16, 2021 for U.S. Appl. No. 16/552,884.

Notice of allowance dated Sep. 9, 2021 for U.S. Appl. No. 16/552,884 (no refs).

Notice of Allowance dated Jul. 21, 2021 for U.S. Appl. No. 16/552,993.

Vom Slack-Team, "6 ways to use Google Drive Bot's newest features", Aug. 15, 2018, https://slack.com/intl/de-de/blog/productivity/6-ways-to-use-google-drive-bots-newest-features (Year: 2018).

Google.com, "Let users see file activity (Activity dashboard)", Jan. 9, 2019, https://support.google.com/a/answer/7573825?hl=en (Year: 2019).

European Search Report dated Jul. 22, 2021 for EP Applcation No. 19 85 5932.

Translation of CN 101404696A retrieved from Google Patents.

Notice of Allowance dated Mar. 16, 2022 for U.S. Appl. No. 16/552,993.

Non-Final Office Action dated Mar. 6, 2023 for U.S. Appl. No. 17/816,677.

(56) References Cited

OTHER PUBLICATIONS

Notice of Allowance for U.S. Appl. No. 17/817,968 dated Jul. 6, 2023.

* cited by examiner

FORMING ACTIVITY STREAMS ACROSS HETEROGENEOUS APPLICATIONS

CROSS-REFERENCE TO RELATED APPLICATION(S)

The present application is a continuation of U.S. patent application Ser. No. 16/552,993 titled "FORMING ACTIVITY STREAMS ACROSS HETEROGENEOUS APPLICATIONS", filed on Aug. 27, 2019, which claims the benefit of priority to U.S. Patent Application Ser. No. 62/723,336 titled "COLLABORATION SYSTEM FEEDS", filed on Aug. 27, 2018, which are hereby incorporated by reference in their entirety.

FIELD

This disclosure relates to shared content management systems, and more particularly to techniques for forming activity streams across heterogeneous applications.

BACKGROUND

Enterprises encourage collaboration to boost efficiency, productivity, and creativity. Such collaboration often involves many users of a computing environment who interact (e.g., author, comment, share, etc.) with computer-readable content objects (e.g., documents, spreadsheets, images, programming code files, etc.). In addition to the foregoing user-to-content collaboration activity, collaboration activity may also involve explicit user-to-user interactions (e.g., messaging, chatting, sending and responding to object sharing invitations, etc.) and/or implicit user-to-user relationships (e.g., based on roles, organizational structures, etc.). In such environments, the efficiency, productivity, and creativity benefits of collaboration for a particular user can be enhanced by a knowledge of the collaboration activities of other users. Based on the knowledge of such activities, for example, a user might initiate a new collaboration activity (e.g., with a content object, with another user, etc.).

Today's enterprises often promote the foregoing collaboration activities by using a cloud-based content management system to efficiently and securely provision content object access to various individual users and/or to efficiently and securely provision content object access to collaborative groups of users. Such cloud-based content management systems facilitate sharing of large volumes of content objects among trusted users on a variety of user devices such as mobile phones, tablets, laptop computers, desktop computers, and/or other devices. For example, a content management system might be used to facilitate collaboration activities at a large enterprise with thousands of users (e.g., employees) and many terabytes of data comprising content objects. A native application (e.g., browser portal, mobile application, etc.) is often provided and maintained by the content management system to facilitate user-to-content and user-to-user collaboration activities.

In some cases, certain collaboration activities and/or interactions over the content objects that are managed by a content management system are performed at or by one or more third-party applications, rather than at or by the native applications of the content management system. Such third-party applications may be selected from hundreds of heterogeneous third-party applications. Such third-party applications might be made available in a computing environment for a variety of reasons. As examples, such third-party applications might be made available based on (1) the familiarity and/or proficiency of users with the application; (2) the popularity and/or functionality of the application as pertains to a particular content object type, and/or (3) a particular interaction (e.g., operation) and/or a particular set of interactions (e.g., workflow) over that content object type; and/or (4) based on other reasons. As a specific example, a contract document that is managed by a content management system might be shared using a first third-party application (e.g., SLACK™) to facilitate the development of the contract and then be submitted to a second third-party application (e.g., DOCUSIGN™) to facilitate execution (e.g., signing) of the contract. With the prevalent use of numerous third-party applications in today's computing environments, knowledge of the collaboration activity performed over content objects at such third-party applications can enhance the efficiency, productivity, and creativity of collaborators.

Unfortunately, as the number of applications and/or the number of users and/or the volume of content objects of an enterprise continue to grow, challenges to managing (e.g., recording, filtering, presenting, etc.) the collaboration activities performed at the numerous applications grows commensurately. Consider the foregoing example where users are interacting with a contract document using a third-party messaging application and a third-party electronic signing application. In this case, any of the users involved with the workflows performed in the third-party applications would benefit from knowing the recent activities and/or the then-current states of such workflows at certain moments in time. However, there are no mechanisms for capturing such information over multiple applications and presenting human-readable summaries of the activities to the users. Moreover, the heterogenous characteristics (e.g., data structures, data models, user interfaces, terminology, etc.) of the many applications that are candidates for integrating into a single computing environment raises further challenges pertaining to presenting human-readable summaries of the activities. What is needed is a way of capturing and presenting collaboration activity performed over numerous heterogeneous applications.

SUMMARY

The present disclosure describes techniques used in systems, methods, and in computer program products for forming activity streams across heterogeneous applications, which techniques advance the relevant technologies to address technological issues with legacy approaches. More specifically, the present disclosure describes techniques used in systems, methods, and in computer program products for collecting and analyzing collaboration activities that are performed over shared content objects using multiple heterogeneous applications.

The disclosed embodiments modify and improve over legacy approaches. In particular, the herein-disclosed techniques provide technical solutions that address the technical problems attendant to tracking collaboration activity over numerous heterogeneous applications in an Internet-enabled computing environment. Such technical solutions involve specific implementations (i.e., data organization, data communication paths, module-to-module interrelationships, etc.) that relate to the software arts for improving computer functionality. Moreover, information that is received during operation of the embodiments is transformed by processes that store data into and retrieve data from the aforementioned data structures. The herein-disclosed techniques implement application-specific data structures that are used to manage collaboration activity, which techniques serve to overcome heretofore unsolved technological problems associated with tracking collaboration activity over heterogeneous applications. Moreover, the disclosed embodiments implement technological solutions pertaining to technological problems that arise in the hardware and software arts that underlie collaboration systems. Aspects of the present disclosure achieve performance and other improvements in peripheral technical fields including (but not limited to) human-machine interfaces and technical fields pertaining to managing collaboration workflows.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
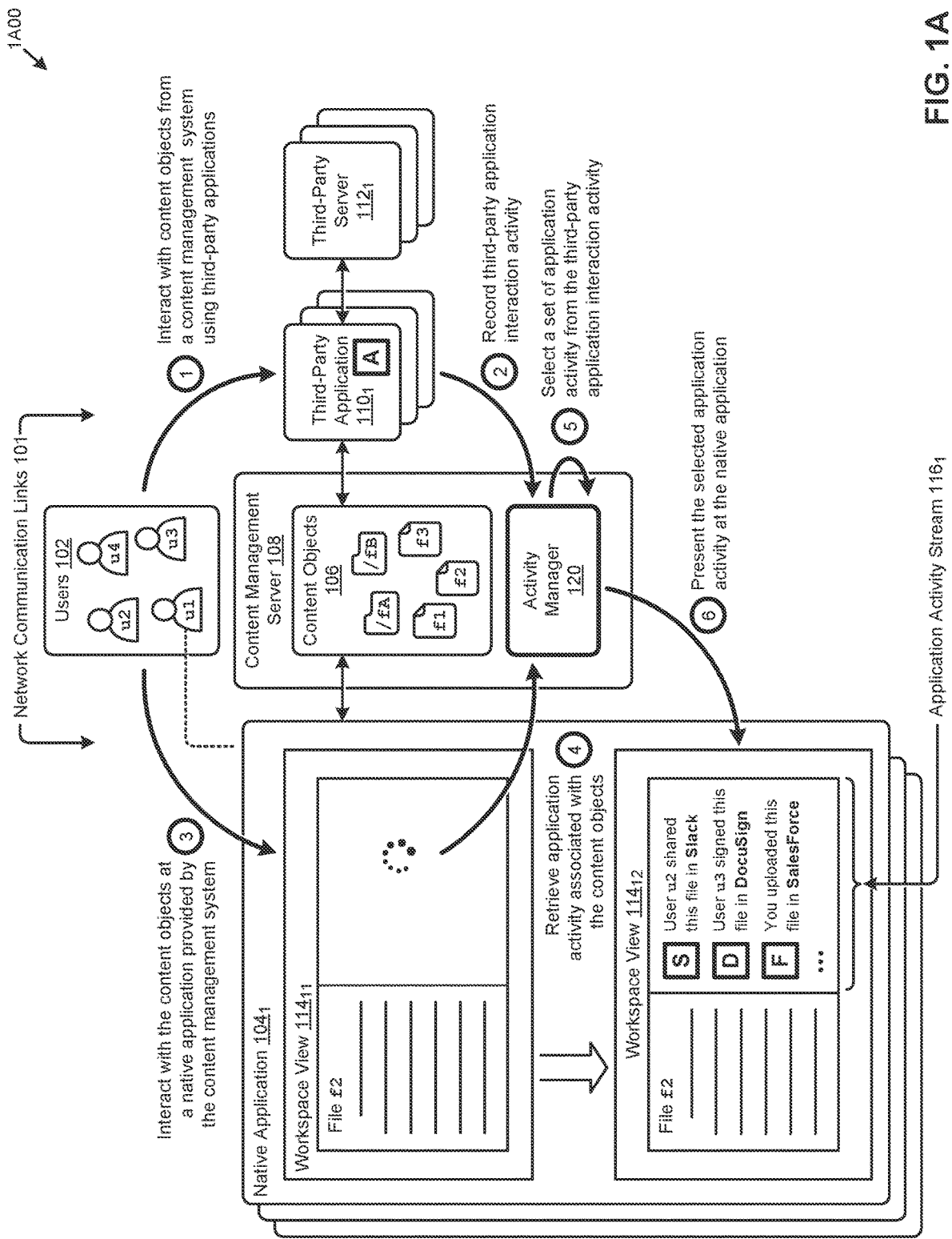
FIG. 1A illustrates a computing environment in which embodiments of the present disclosure can be implemented.

Aspects of the present disclosure solve problems associated with using computer systems for tracking collaboration activity over numerous heterogeneous applications in a networked computing environment. Some embodiments are directed to approaches for implementing application-specific data structures to manage collaboration activities performed over a shared content object by multiple heterogeneous applications. The accompanying figures and discussions herein present example environments, systems, methods, and computer program products Overview Disclosed herein are techniques for implementing application-specific data structures to manage collaboration activities that are performed at multiple heterogeneous applications in a computing environment. In certain embodiments, the techniques are implemented in a computing environment comprising a content management system that facilitates interactions over a plurality of users and a plurality of content objects managed by the content management system. In exemplary embodiments, a content management system provides one or more native applications (e.g., a browser portal, a mobile application, etc.) that are accessed by its users to facilitate interactions (e.g., authoring, editing, viewing, etc.) with the content objects. In the same computing environment, the users can also interact with the content objects using third-party applications that are integrated with the native application. Such third-party applications are applications that are not provided and/or maintained as a part of the content management system but rather are applications that are provided and/or maintained by third parties. These third-party applications are integrated with the content management system so as to facilitate collaboration over the content objects.

When users interact with content objects using third-party applications, the corresponding activities are recorded at the content management system. Application-specific data structures facilitate the recording of activity from multiple heterogeneous third-party applications. At certain moments in time, the activities associated with the third-party applications are processed to select specific subsets of activities. For example, when a user accesses a content object at the native application, a request is issued from the native application to select a set of activities—possibly including third-party application activities—that are relevant to that particular user and/or that are relevant to that particular content object. Activity streams that describe the selected activities are generated and presented to the user in a user interface of the native application.

Such generation and/or presentation of activity streams over many heterogeneous third-party applications in the computing environment are facilitated by maintenance of the aforementioned application-specific data structures. In certain embodiments, the application-specific data structures are derived from activity templates. In certain embodiments, some of the activities are selected (or rejected) based on various permissions attributes associated with the users, and/or based on permissions attributes that apply to the content objects, and/or based on permissions attributes pertaining to the use and or function of the third-party applications. In certain embodiments, portions of the activity streams include active elements (e.g., http links) that are presented in a user interface of the native application.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a computing environment 1A00 in which embodiments of the present disclosure can be implemented. As an option, one or more variations of computing environment 1A00 or any aspect thereof may be implemented in the context of the architecture and functionality of the embodiments described herein.

FIG. 1A illustrates aspects pertaining to implementing application-specific data structures to manage collaboration activity performed at or by multiple heterogeneous applications in a computing environment. Specifically, the figure presents a logical depiction of how the herein disclosed techniques can be used to generate and present application activity streams that are derived from interactions with content objects performed using a plurality of heterogeneous applications. A representative set of high order operations are also presented to illustrate how the herein disclosed techniques might be applied in computing environment 1A00.

The logical depiction of FIG. 1A depicts a representative set of users 102 (e.g., user "u1", user "u2", user "u3", and user "u4") who desire to interact with various instances of content objects 106 (e.g., folder "fA", folder "fB", file "f1", file "f2", file "f3") managed at a content management server 108. Users 102 may be users of a content management system that facilitates interactions (e.g., authoring, editing, viewing, etc.) over content objects 106 for sharing, collaboration, and/or other purposes. In some cases, such interactions are organized into workflows. Interactions and/or workflows over a particular content object may be performed by one or more users and/or even autonomously by one or more computing entities (e.g., processes, agents, applications, etc.). As indicated in the figure, the content management system provides instances of a native application that can be accessed by respective individual ones of the users 102 to facilitate interactions with content objects 106 and/or with one another. As an example, native application $104_1$ might be a browser portal or mobile application accessed by user "u1" to interact with file "f2" from content objects 106 and/or interact with other users from users 102.

As can be observed, a plurality of third-party applications is also accessible by users 102 to interact with content objects 106 and/or other users. For example, third-party application $110_1$ might be an application "A" (e.g., a web application, a mobile application, etc.) served by a third-party server $112_1$ and accessed or accessible by some or all of users 102 to perform such interactions. The applications referred-to herein as "third-party applications" are applications that are provided (e.g., developed, delivered, served, maintained, etc.) by an entity (e.g., the owner of third-party server $112_1$) other than the entity (e.g., content management system provider) that provides the content management server 108. While such third-party applications are applications that are not provided and/or maintained by the provider of the content management system, the applications may still be integrated with the content management system to facilitate certain interactions with at least some of the types of content objects 106 managed at the content management system (e.g., at content management server 108). Such integration may include registration of the applications with the content management system, establishment of APIs to facilitate communication between the applications and the content management system, establishment of network communication links 101, and/or other integration capabilities. As discussed in more detail herein, certain application-specific data structures associated with integration of the third-party applications facilitate at least some of the herein disclosed techniques.

In many cases, third-party applications can improve the efficiency of the interactions performed over content objects 106. Third-party application $110_1$ may be selected from the hundreds of third-party applications available in computing environment 1A00 for a variety of reasons such as the familiarity and/or proficiency of users with the application, the popularity and/or functionality of the application as pertains to a particular content object type and/or a particular interaction (e.g., operation) over that content object type, and/or for other reasons.

As an example, file "f2" may be a contract document that is managed at content management server 108 and shared using a first third-party application (e.g., Slack) to facilitate the development of the contract, then be submitted to a second third-party application (e.g., DocuSign) to facilitate execution (e.g., signing) of the contract. Knowledge of such collaboration activity performed over file "f2" at these third-party applications can enhance the efficiency, productivity, and creativity of collaborators, such as user "u1". However, there is no mechanism for capturing and presenting the collaboration activity performed over the numerous heterogeneous third-party applications in computing environment 1A00.

The herein disclosed techniques address such challenges pertaining to tracking collaboration activity over numerous heterogeneous applications in a computing environment at least in part by implementing application-specific data structures to record and present the activity performed over content objects 106 at multiple heterogeneous third-party applications in computing environment 1A00. In the embodiment of FIG. 1A, the techniques are facilitated at least in part by an activity manager 120 implemented at content management server 108. When users 102 interact with content objects 106 using third-party applications (operation 1), the corresponding interaction activity is recorded by activity manager 120 at content management server 108 (operation 2).

When a user accesses a particular content object at the native application (operation 3), a request is issued to activity manager 120 from the native application to retrieve any application activity that is relevant to that particular user and/or is relevant to that particular content object (operation 4). For example, user "u1" might the access the native application $104_1$ to interact with file "f2". In response to a workspace view $114_{11}$ being presented at native application $104_1$, an application activity request associated with user "u1" and file "f2" is issued to activity manager 120. The application activity request invokes the selection of a set of application activity from the corpus of recorded activity associated with the third-party applications (operation 5).

In certain embodiments, the set of application activity is filtered according to certain permissions associated with the users and/or the content objects and/or the third-party applications. The set of application activity selected (and filtered) in accordance with the herein disclosed techniques is then presented as an application activity stream to a user at the user interface of the native application (operation 6). Specifically, an application activity stream $116_1$ is presented to user "u1" in a workspace view $114_{12}$ at native application $104_1$. More specifically, application activity stream $116_1$ comprises activity stream entries, that correspond to activity at applications represented by an "S" icon, a "D" icon, and an "F" icon. In some cases, hyperlinks (e.g., http links using hypertext markup language constructs) are added to the application activity stream to facilitate user interactions with the stream entries.

The foregoing discussions describe application activity streams that are presented in user interfaces according to the herein disclosed techniques, which application activity streams are disclosed in further detail as follows.

Figure 1B:
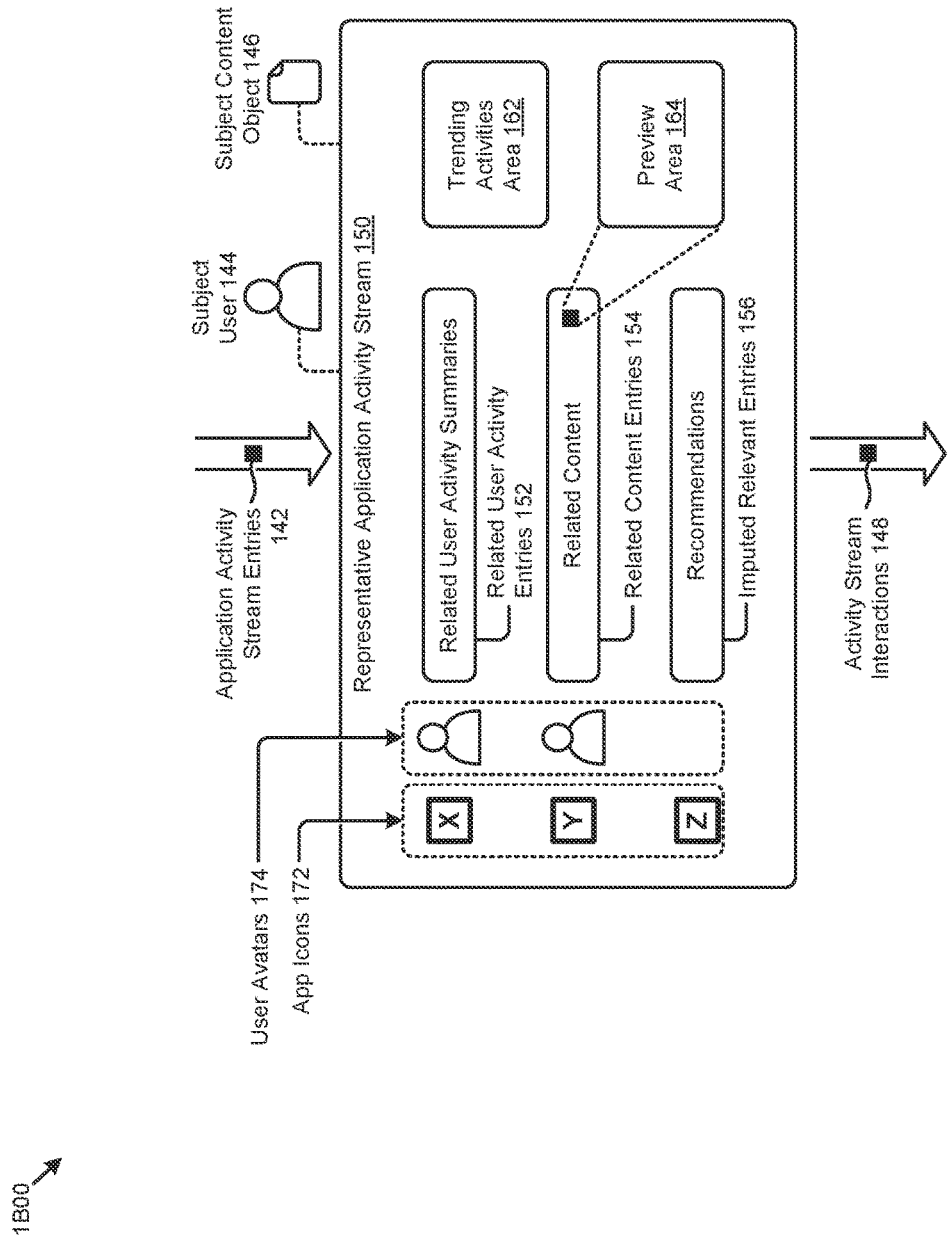
FIG. 1B illustrates an activity stream structure as implemented in systems that facilitate collecting and analyzing collaboration activities performed in heterogeneous applications, according to an embodiment.

FIG. 1B illustrates an activity stream structure 1B00 as implemented in systems that facilitate collecting and analyzing collaboration activities performed in heterogeneous applications. As an option, one or more variations of activity stream structure 1B00 or any aspect thereof may be implemented in the context of the architecture and functionality of the embodiments described herein. The activity stream structure 1B00 or any aspect thereof may be implemented in any environment.

FIG. 1B illustrates a configuration of various user interface components that constitute an application activity stream. Specifically, a representative application activity stream 150 may be associated with a subject user 144 and a subject content object 146. As such, the content of representative application activity stream 150 may be user-specific (e.g., associated with subject user 144) and/or content-specific (e.g., associated with subject content object 146). As shown, a set of application activity stream entries 142 associated with subject user 144 and subject content object 146 are organized for presentation into representative application activity stream 150. As can be observed, representative application activity stream 150 includes an area for presenting related user activity summaries, an area for presenting related content, an area for presenting recommendations, an area for presenting trending activities (e.g., in a trending activities area 162), and an area for presenting content previews (e.g., in a preview area 164).

The area for presenting related user activity summaries comprises one or more related user activity entries 152, the area for presenting related content comprises one or more related content entries 154, and the area for presenting recommendations comprises one or more imputed relevant entries 156. The related user activity entries 152, the related content entries 154, and the imputed relevant entries 156 are constituents of and/or derived from application activity stream entries 142. As can be observed, any of the foregoing entries might have a corresponding instance of app icons 172 and/or a corresponding instances of user avatars 174 that are presented with the entries in the application activity stream.

Moreover, any of the components of representative application activity stream 150 might have corresponding hyperlinks to facilitate user interactions with the stream. For example, preview area 164 associated with related content entries 154 offers a user an opportunity to identify any of the related content entries by interacting with an icon or image that is presented in the preview area.

Techniques of the present application, in particular certain techniques for handling app icons are related to co-pending U.S. patent application Ser. No. 16/552,884, titled "ACTIVITY-BASED APPLICATION RECOMMENDATIONS", filed on even date herewith, which is hereby incorporated by reference in its entirety.

In many embodiments, the icon or image includes a corresponding hyperlink that issues a command when the user selects (e.g., clicks on, hovers over, etc.) the icon or image. When the user interacts with any of the interactive components of representative application activity stream 150, instances of activity stream interactions 148 are captured by the computing agent or agents that manage the application activity stream. For example, activity stream interactions 148 might be received at an activity manager operating at a content management system.

One embodiment of techniques for identifying activity performed over content objects at multiple heterogeneous third-party applications for presentation in such application activity streams is disclosed in further detail as follows.

Figure 2:
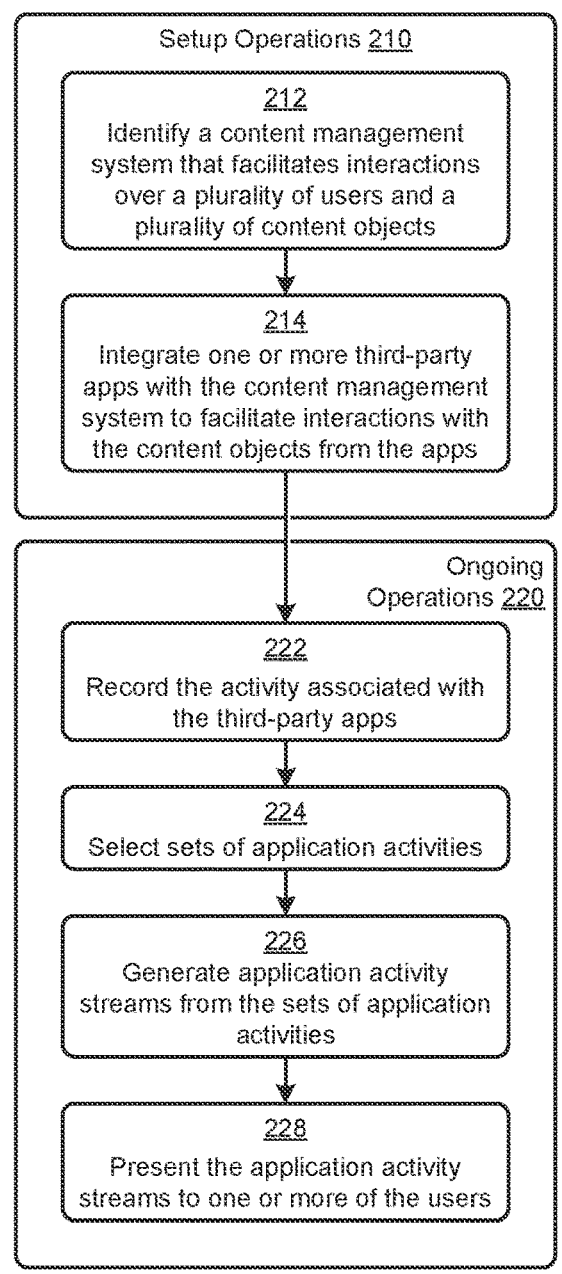
FIG. 2 depicts an application activity management technique as implemented in systems that facilitate collecting and analyzing collaboration activities performed in heterogeneous applications, according to an embodiment.

FIG. 2 depicts an application activity management technique 200 as implemented in systems that facilitate collecting and analyzing collaboration activities performed in heterogeneous applications. As an option, one or more variations of application activity management technique 200 or any aspect thereof may be implemented in the context of the architecture and functionality of the embodiments described herein. The application activity management technique 200 or any aspect thereof may be implemented in any environment.

FIG. 2 illustrates aspects pertaining to implementing application-specific data structures to manage collaboration activity performed at multiple heterogeneous applications in a computing environment. Specifically, the figure is presented to illustrate one embodiment of certain steps and/or operations performed over a network of devices (e.g., user devices, computing systems, etc.) to record and analyze activity over content objects performed at third-party application to generate and present application activity streams. As can be observed, the steps and/or operations can be grouped into a set of setup operations 210 and a set of ongoing operations 220.

The setup operations 210 of application activity management technique 200 commences by identifying a content management system that facilitates interactions over a plurality of users and a plurality of content objects (step 212). Such interactions can involve both user-to-user interactions and user-content interactions. One or more third-party applications (e.g., apps) are integrated with the content management system to facilitate interactions over the users and/or content objects performed at the apps (step 214). As an example, a contract document managed by the content management system might be shared using a first third-party application (e.g., Slack) to facilitate the development of the contract and then be submitted to a second third-party application (e.g., DocuSign) to facilitate execution (e.g., signing) of the contract. In this case, Slack and DocuSign might be registered with the content management system to facilitate authorized access to the contract document managed (e.g., stored, updated, etc.) at the content management system. As described herein, the integration and/or registration may also involve establishing certain application-specific data structures (e.g., templates) to facilitate the application activity management technique 200 and/or other herein disclosed techniques.

As depicted in the ongoing operations 220, any activity (e.g., interaction events) associated with third-party apps are recorded (step 222). Referring to the aforementioned example, the integration of Slack and DocuSign with the content management system might further involve the establishment of an API to record activity at the content management system that occurs at these apps. The posting and/or recording of the activity may be in accordance with certain application-specific data structures. Sets of application activities from the corpus of all recorded activities are selected (step 224).

As described in more detail herein, a set of application activities often pertains to a particular user and/or particular content object and/or particular content object type and/or particular application. As an example, a set of application activity might be selected according to application activity management technique 200 and/or other herein disclosed techniques in response to a request issued on behalf of a particular user who is interacting with a particular content object at a native application provided by the content management system. The sets of application activity are often filtered in accordance with certain attributes (e.g., permissions) associated with the users, the content objects, and/or the applications represented in the application activity.

Respective instances of application activity streams are generated from the sets of application activity selected from the recorded application activity (step 226). An application activity stream is an organized collection of application activity stream entries derived from a respective set of application activity. Specifically, the application activity stream entries are sets of human-readable content derived from the attributes of respective instances of application activity records that characterize the set of application activity. As such, the application activity streams generated according to application activity management technique 200 and/or other herein disclosed techniques are often presented to one or more users (step 228). As an example, an application activity stream might be presented to a user at a native application provided by the content management system.

One embodiment of a system, data flows, and data structures for implementing the application activity management technique 200 and/or other herein disclosed techniques, is disclosed as follows.

Figure 3A:
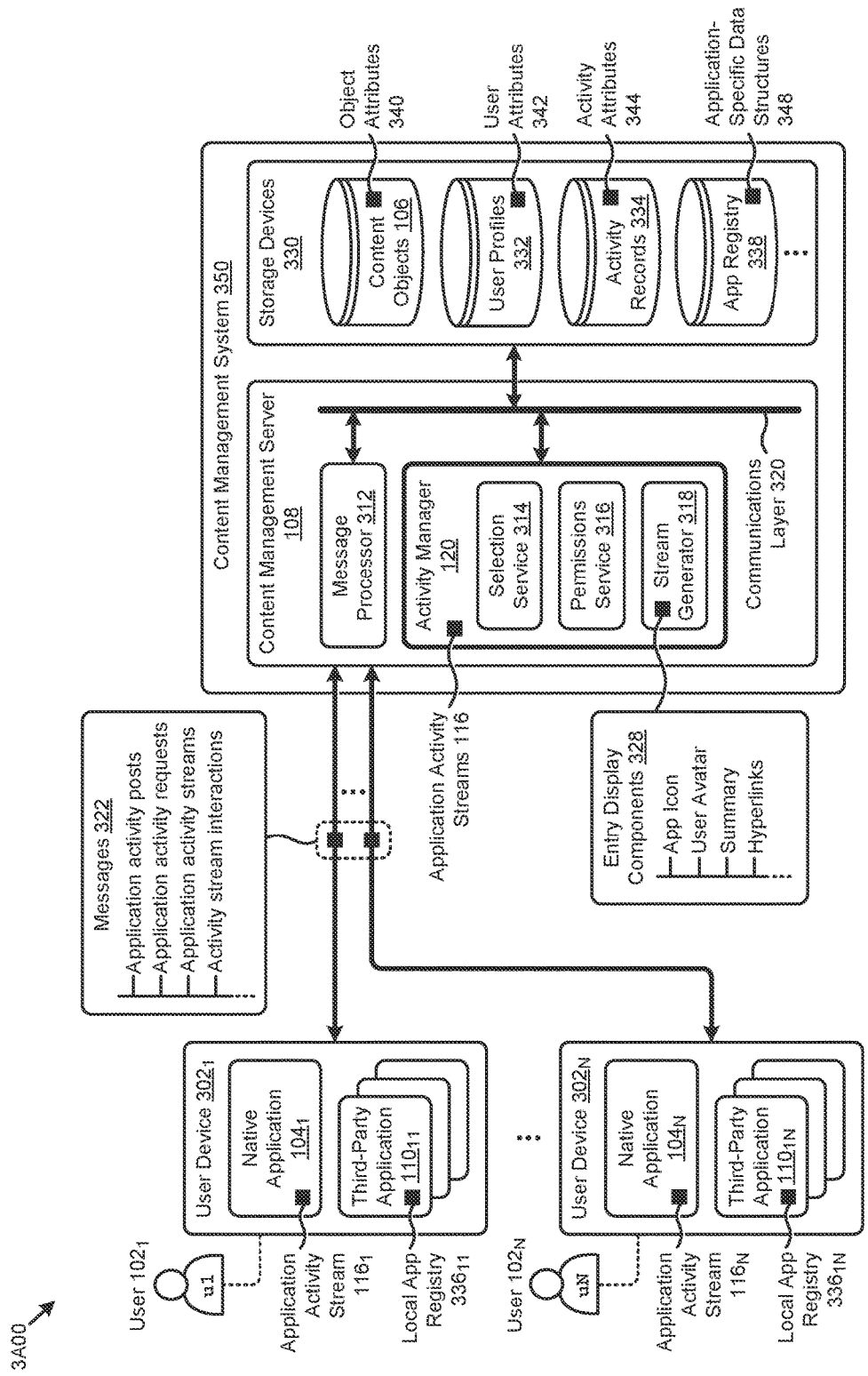
FIG. 3A presents a block diagram of a system that collects and analyzes collaboration activities performed in heterogeneous applications, according to an embodiment.

FIG. 3A presents a block diagram of a system 3A00 that collects and analyzes collaboration activities performed in heterogeneous applications. As an option, one or more variations of system 3A00 or any aspect thereof may be implemented in the context of the architecture and functionality of the embodiments described herein. The system 3A00 or any aspect thereof may be implemented in any environment.

FIG. 3A illustrates aspects pertaining to implementing application-specific data structures to manage collaboration activity performed at multiple heterogeneous applications in a computing environment. Specifically, the figure is being presented to show one embodiment of certain representative components and associated data structures and data flows implemented in a computing environment to facilitate the herein disclosed techniques. As shown, the components, data flows, and data structures are associated with a set of users (e.g., user $102_1$, . . . , user $102_N$) that interact with each other and a set of content objects 106 managed at a content management system 350. The components, data flows, and data structures shown in FIG. 3A present one partitioning and associated data manipulation approach. The specific example shown is purely exemplary, and other subsystems, data structures, and/or partitioning are reasonable.

As shown, system 3A00 comprises an instance of content management server 108 operating at content management system 350. Content management server 108 comprises a message processor 312 and an instance of an activity manager 120, which comprises a selection service 314, a permissions service 316, and a stream generator 318. A plurality of instances of the foregoing components might operate at a plurality of instances of servers (e.g., content management server 108) at content management system 350 and/or any portion of system 3A00. Such instances can interact with a communications layer 320 to access each other and/or a set of storage devices 330 that store various information to support the operation of the components of system 3A00 and/or any implementations of the herein disclosed techniques.

For example, the servers and/or storage devices of content management system 350 might facilitate interactions over content objects 106 by the users (e.g., user $102_1$, . . . , user $102_N$) from a respective set of user devices (e.g., user device $302_1$, . . . , user device $302_N$). A content management system "manages" a plurality of content objects at least in part by maintaining (e.g., storing, updating, resolving interaction conflicts, etc.) the content objects subject to the various interactions performed over the content objects by users of the content objects at their respective user devices. The content objects (e.g., files, folders, etc.) in content objects 106 are characterized at least in part by a set of object attributes 340 (e.g., content object metadata) stored at storage devices 330. Furthermore, the users are characterized at least in part by a set of user attributes 342 stored in a set of user profiles 332 at storage devices 330.

The users access instances of a native application (e.g., native application $104_1$, . . . , native application $104_N$) and/or instances of various third-party applications (e.g., third-party application $110_{11}$, . . . , third-party application $110_{1N}$) so as to interact with content objects 106 managed by content management system 350. In some cases, third-party applications are integrated with content management system 350 to facilitate interactions performed at the third-party applications over content objects managed by the system.

Various information pertaining to such integrations with content management system 350 are codified in an app registry 338 stored in storage devices 330. At least some information of app registry 338 is organized according to instances of application-specific data structures 348, which data structures serve to improve the way computing entities in system 3A00 store and retrieve data in memory when performing the herein disclosed techniques. As illustrated, certain portions of the information in app registry 338 might be locally accessible at the user devices by the third-party applications. For example, a local app registry $336_{11}$ might be accessible by third-party application $110_{11}$ at user device $302_1$ and a local app registry $336_{1N}$ might be accessible by third-party application $110_{1N}$ at user device $302_N$.

The instances of the native application and/or the third-party applications operating at the user devices send or receive various instances of messages 322 that are received or sent by message processor 312 at content management server 108. In some cases, messages 322 are sent to or received from content management server 108 without human interaction.

One class of messages 322 corresponds to application activity posts that are issued from the third-party applications to message processor 312 in response to interaction events that correspond to interactions with content objects 106 performed at the third-party applications. As described in further detail herein, the application activity posts often comprise certain application-specific information as specified in a local app registry. The message processor 312 at content management server 108 monitors the messages 322 to detect the application activity posts issued from the third-party applications. Message processor 312 codifies certain activity attributes 344 pertaining to the application activity posts in a set of activity records 334 stored in storage devices 330. In some cases, and to facilitate populating the activity records 334, message processor 312 will access the user attributes 342 (e.g., user identifiers, etc.) stored in user profiles 332 and/or the object attributes 340 (e.g., content object identifiers, etc.) stored in content objects 106.

In some embodiments, a third-party application sends messages pertaining to occurrences of application activity posts (e.g., including a timestamp) to the message processor 312, which message processor in turn relays information pertaining to occurrences of the application activity posts to the native application. As such, even if certain aspects of an application activity post are filtered-out (e.g., due to permissions), the native application can process the fact of the occurrences of the application activity posts, possibly by indicating the mere occurrence of the post in a user interface—in spite of the native application not being able to show the details of the post (e.g., due to lack of permissions to do so).

At certain moments in time, such as when a user interacts with a content object, instances of messages 322 comprising application activity requests are received at message processor 312. Such application activity requests are issued by users (e.g., at their respective user devices) to retrieve sets of application activities that are to be presented in application activity streams according to the herein disclosed techniques. For example, in response to user $102_1$ loading a particular content object in native application $104_1$ at user device $302_1$, an application activity request is issued from native application $104_1$ to return an application activity stream $116_1$ that is presented in the user interface of native application $104_1$. In this case, application activity stream $116_1$ is determined based at least in part on attributes associated with user $102_1$, the particular content object, and/or other entities. As shown, another application activity stream 116N that is specific to a particular application activity request issued from user device $302_N$ is presented in the user interface of native application $104_N$.

In response to receiving application activity requests, activity manager 120 accesses the selection service 314 to select respective sets of application activities from activity records 334 in accordance with attributes associated with the requests. The permissions service 316 is then called to filter the sets of application activities according to various permissions-based constraints. Specifically, permissions service 316 accesses certain information to determine which of the selected application activities are valid for presentation to the users. Any application activity deemed by permissions service 316 as being not valid for presentation are removed from the sets of application activities. An application activity might be deemed invalid for several reasons.

As an example, permissions service 316 might access the user attributes 342 in user profiles and/or the object attributes 340 (e.g., content object metadata) in content objects 106 to filter the sets of application activities according to certain user-specific permissions and/or certain content-specific permissions, respectively. Such filtering might remove application activities from a set of application activities that involve content objects and/or interactions over content objects that a user is not permitted to view. As another example, certain application-specific permissions codified in app registry 338 might be applied to the sets of application activities. Such application-specific permissions might remove application activities from a set of application activities that pertain to applications that are not accessible by a user. Other permissions information and/or criteria may be considered by permissions service 316 when filtering the sets of application activities.

Specifically, the permissions information and/or criteria that may be considered by permissions service 316 when filtering the sets of application activities may include filtering-out or selecting-in specific instances of application activity records based on aspects of permissions attributes that pertain to a particular content object, or based on aspects of permissions attributes that pertain to a particular interaction or type of interaction, or based on aspects of the permissions attributes that correspond to a particular user.

The selected and filtered sets of application activities are accessed by the stream generator 318 to generate respective instances of application activity streams 116 at activity manager 120. Specifically, stream generator 318 generates the user interface display elements that comprise an active, visual presentation of the filtered sets of application activities that constitute the application activity streams. Each application activity stream comprises a collection of application activity stream entries that respectively correspond to the application activities associated with the stream.

As can be observed by a representative set of entry display components 328, a particular application activity stream entry might be visually represented in a user interface by one or more of, an app icon, a user avatar, an activity summary, underlying hyperlinks, and/or other components. The entry display components for an entry are derived from respective data from activity records 334, app registry 338, and/or other data sources. The user interface display elements and other information associated with the application activity streams are codified in instances of messages 322 and delivered to the users. As an example, instances of application activity streams are dynamically generated and presented to respective users in their corresponding instances of the native application. Interactions (e.g., hyperlink clicks) with the application activity streams by the user at the native application are received as instances of messages 322 at content management server 108.

A detailed embodiment of the application-specific data structures associated with the third-party application registries described herein is disclosed as follows.

Figure 3B:
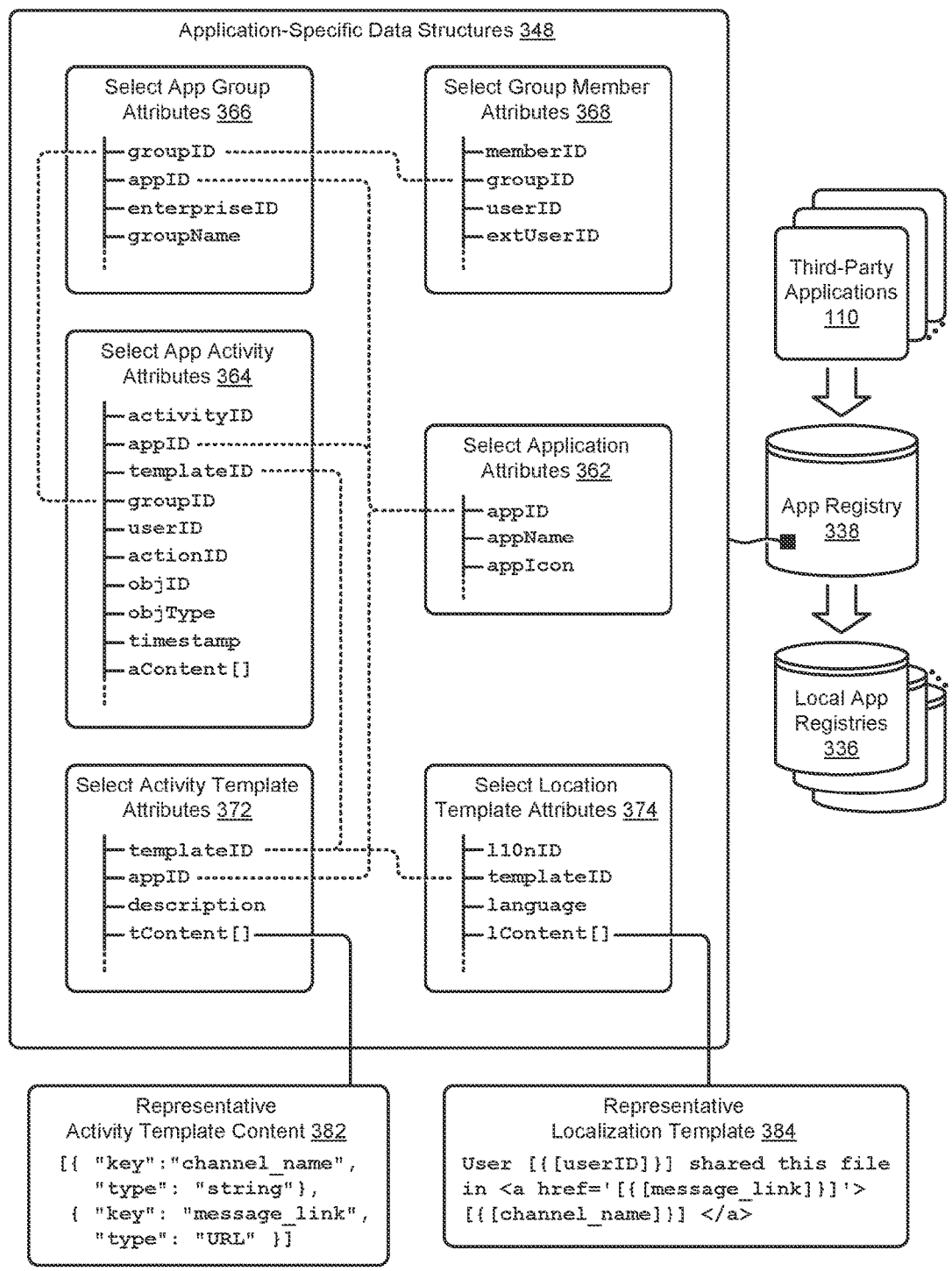
FIG. 3B illustrates an application-specific data management technique as implemented in systems that collect and analyze collaboration activities performed over multiple heterogeneous applications, according to an embodiment.

FIG. 3B illustrates an application-specific data management technique 3B00 as implemented in systems that collect and analyze collaboration activities. As an option, one or more variations of application-specific data management technique 3B00 or any aspect thereof may be implemented in the context of the architecture and functionality of the embodiments described herein. The application-specific data management technique 3B00 or any aspect thereof may be implemented in any environment.

FIG. 3B illustrates aspects pertaining to implementing application-specific data structures to manage collaboration activity performed at multiple heterogeneous applications in a computing environment. Specifically, the figure presents certain specialized data structures that are established to improve the way a computer stores and retrieves certain data in memory when performing the herein disclosed techniques. Such specialized data structures can be organized and/or stored using various techniques. For example, the application-specific data structures 348 shown in FIG. 3B indicate that the underlying data associated with the data structures might be organized and/or stored in a tabular structure (e.g., relational database table) that has rows that relate various attributes with a particular data entity. As another example, the underlying data might be organized and/or stored in a programming code object that has instances corresponding to a particular data entity and properties corresponding to the various attributes associated with the data entity. A set of representative relationships between application-specific data structures 348 are also shown.

When certain instances of third-party applications 110 are integrated (e.g., registered) with a content management system, respective sets of data are populated in an app registry 338 in accordance with one or more of the application-specific data structures 348. In some cases, certain portions of such data are populated in response to various inputs (e.g., selections, entered text, etc.) received from system administrators and/or application developers by interacting with a user interface (e.g., admin and/or developer console). As shown, some or all of the data from app registry 338 might be replicated to instances of local app registries 336. For example, a local app registry might be stored as a set of metadata associated with a particular third-party application operating at a user device that is remote to the content management system. The metadata of the local app registry might be accessed to facilitate certain herein disclosed techniques (e.g., issuing application activity posts, etc.).

As indicated in a set of select application attributes 362 in the application-specific data structures 348, each of the third-party applications 110 that are registered with the content management system is identified by an application identifier (e.g., stored in an "app ID" field), an application name (e.g., stored in an "appName" field), an application icon (e.g., stored in an "appIcon" field), and/or other attributes. As can be observed, the application identifier or "app ID" is referenced by other data structures to associate the data underlying those structures with a particular third-party application.

Specifically, sets of select app group attributes 366 associate groups of users with particular third-party applications. Such application-specific user groups are accessed, for example, to apply application-specific permissions to filter sets of application activities as discussed in more detail herein. As shown, the user groups are described by a group identifier (e.g., stored in a "groupID" field), an application identifier of an associated third-party application (e.g., stored in an "appID" field), an enterprise identifier (e.g., stored in an "enterpriseID" field), a group name (e.g., stored in a "groupName" field), and/or other attributes.

Each member of the user groups is described in another data structure referenced according to the "groupID" of the user groups. As indicated by a set of select group member attributes 368, each member of a particular group identified in a "groupID" field is described by a member identifier (e.g., stored in a "memberID" field), a user identifier (e.g., stored in a "userID" field), an external user identifier (e.g., stored in an "extUserID" field), and/or other attributes. As an example, group members that are users of the content management system might be identified by a unique "user ID" assigned by the system, whereas group members that are not users of the content management system might be identified by their email address stored in the "extUserID" field.

A set of select activity template attributes 372 in application-specific data structures 348 indicates that certain activity templates associated with the third-party application are codified in app registry 338. The activity templates define, at least in part, certain semantics associated with a particular third-party application. Specifically, in addition to a templated identifier (e.g., stored in a "templateID" field), other fields can include an application identifier of an associated third-party application (e.g., stored in an "appID" field), a description of the template (e.g., stored in a "description" field), and/or other attributes. The select activity template attributes 372 also includes a set of content (e.g., stored in a "tcontent[ ]" object) that describes certain semantic information associated with the associated third-party application. As shown in a set of representative activity template content 382, such semantic information might include application-specific metadata keys (e.g., "channel_name" and "message_link") and their respective data types (e.g., "string" and "URL"). The foregoing application-specific information is used to record and present activities performed at the particular associated third-party application as described in more detail herein.

The presentation of activities performed at a particular third-party application is facilitated by data stored in another data structure referenced according to the "template ID" of the activity templates. As indicated by a set of select location template attributes 374, certain localization content (e.g., stored in an "lcontent [ ]" object) associated with a particular template identified in a "templateID" field is described by a localization data identifier (e.g., stored in an "l10nID" field), a language identifier (e.g., stored in a "language" field), and/or other attributes. As shown in the representative localization template 384, localization might include template elements for presenting a human-readable description of an activity associated with a particular third-party application using the aforementioned application-specific metadata keys.

The recording of activities performed at a particular third-party application is facilitated by an application-specific data structure described by a set of select app activity attributes 364. Specifically, when an interaction event over a content object is detected at a third-party application, some or all of the select app activity attributes 364 are posted by the third-party application to the content management system to be recorded.

As can be observed, such activity attributes include an activity identifier (e.g., stored in an "activityID" field) and references to an associated third-party application identifier (e.g., stored in an "appID" field), an associated template identifier (e.g., stored in a "templateID" field), and an associated group identifier (e.g., stored in a "groupID" field). The activity at the third-party application is described by a user identifier (e.g., stored in a "userID" field), an action identifier (e.g., stored in an "actionID" field), a content object identifier (e.g., stored in an "objID" field), a content object type (e.g., stored in an "objType" field), a timestamp indicating when the activity occurred (e.g., stored in a "timestamp" field), a set of application-specific activity content describing the activity (e.g., stored in an "aContent[ ]" object), and/or other attributes. The information contained in the "aContent[ ]" object is often structured according to the activity template referenced in the "template ID" field.

Further details pertaining to techniques for recording activity performed over content objects at third-party applications (e.g., step 222 of FIG. 2) are disclosed as follows.

Figure 4:
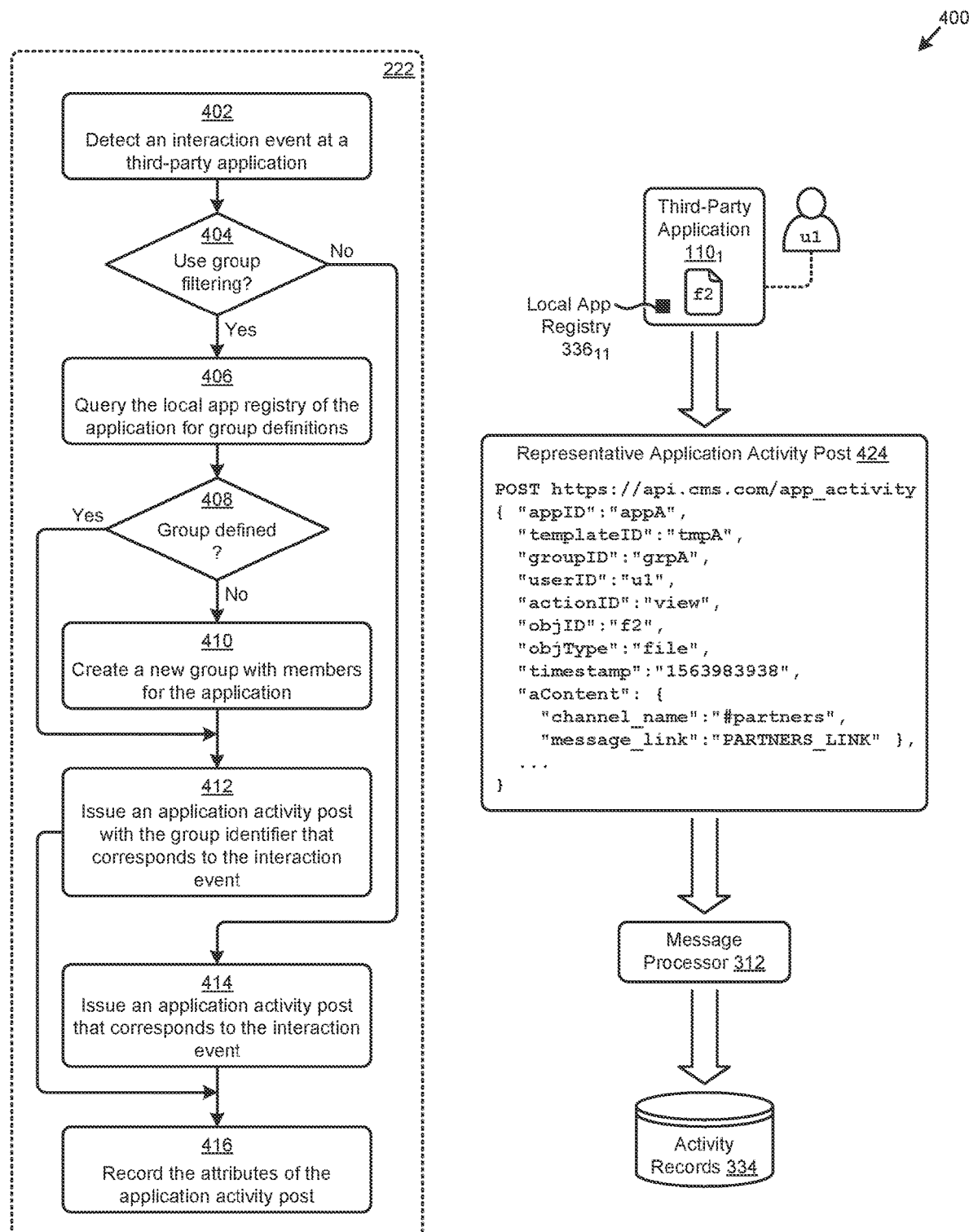
FIG. 4 depicts an application activity recording technique as implemented in systems that facilitate collecting and analyzing collaboration activities performed in heterogeneous applications, according to an embodiment.

FIG. 4 depicts an application activity recording technique 400 as implemented in systems that facilitate collecting and analyzing collaboration activities performed in heterogeneous applications. As an option, one or more variations of application activity recording technique 400 or any aspect thereof may be implemented in the context of the architecture and functionality of the embodiments described herein. The application activity recording technique 400 or any aspect thereof may be implemented in any environment.

FIG. 4 illustrates aspects pertaining to implementing application-specific data structures to manage collaboration activity performed at multiple heterogeneous applications in a computing environment. Specifically, the figure is presented to illustrate one embodiment of certain steps and/or operations that facilitate posting and recording attributes that describe activities (e.g., interactions) over content objects managed by a content management system that are performed at third-party applications. As depicted in the figure, the steps and/or operations are associated with step 222 of FIG. 2. A representative scenario is also shown to illustrate an example application of application activity recording technique 400.

The application activity recording technique 400 commences by detecting an interaction event associated with a content object managed by a content management system that occurs at a particular third-party application (step 402). As illustrated, the interaction event might pertain to an interaction with file "f2" invoked by user "u1" at third-party application $110_1$. A listener is implemented at third-party application $110_1$ to detect interaction events. Such a listener or agent might process groups. For example, if group filtering is to be applied when selecting sets of application activities for application activity streams ("Yes" path of decision 404), then a local app registry associated with the application is queried to identify any group definitions associated with the application (step 406).

For example, local app registry $336_{11}$ might be queried to discover whether a group is defined for third-party application $110_1$. If no group is defined ("No" path of decision 408), then a new group with a corresponding set of members is created (step 410). A group might be created by third-party application $110_1$ posting a group create request to an API at the content management system. In response, the content management system assigns, for example, a group identifier of "grpA" to the newly created group, and the group definition is recorded in an app registry at the system and in the local app registry $336_{11}$ of third-party application $110_1$. Members can be added to the group definition using calls to a group membership API.

When group filtering is used and a group is identified (e.g., taking the "Yes" path of decision 408), an application activity post that includes the group identifier and corresponds to the interaction event is issued (step 412). As can be observed in a representative application activity post 424, third-party application $110_1$ posts a set of application-specific attributes to an "app_activity" API endpoint that describe the activity at application "appA" as being associated with a "view" by user "u1" of file "f2" at Unix time "1563983938".

Certain application-specific information is included in representative application activity post 424 according to an activity template "tmpA". Specifically, the post identifies a "channel_name" of "#partners" and a "message_link" of "PARTNERS_LINK" (e.g., a permanent link to the "#partners" channel). When no group filtering is used ("No" path of decision 404), an application activity post (e.g., with no group identifier) corresponding to the interaction event is issued (step 414). In any case, the attributes of the application activity post are recorded (step 416). As shown, an instance of a message processor 312 earlier described might receive the application activity posts and record the attributes in activity records 334.

The foregoing discussions include techniques for selecting sets of application activities from the activity records (e.g., step 224 of FIG. 2), which techniques are disclosed in further detail as follows.

Figure 5:
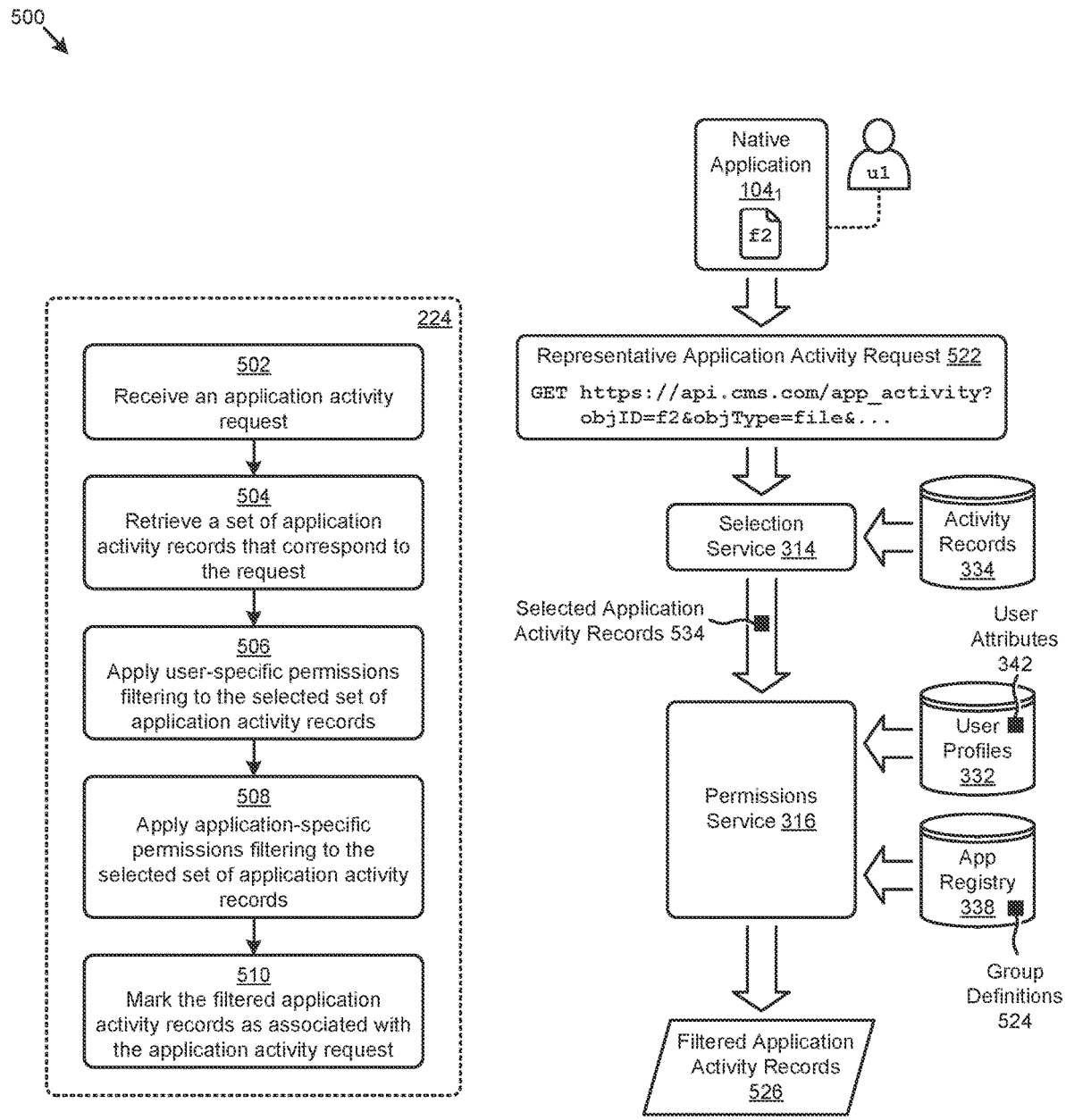
FIG. 5 presents an application activity selection technique as implemented in systems that facilitate collecting and analyzing collaboration activities performed in heterogeneous applications, according to an embodiment.

FIG. 5 presents an application activity selection technique 500 as implemented in systems that facilitate collecting and analyzing collaboration activities performed in heterogeneous applications. As an option, one or more variations of application activity selection technique 500 or any aspect thereof may be implemented in the context of the architecture and functionality of the embodiments described herein. The application activity selection technique 500 or any aspect thereof may be implemented in any environment.

FIG. 5 illustrates aspects pertaining to implementing application-specific data structures to manage collaboration activity performed at multiple heterogeneous applications in a computing environment. Specifically, the figure is presented to illustrate one embodiment of certain steps and/or operations that facilitate selecting and filtering sets of application activities performed over content objects at third-party applications in response to received application activity requests. As depicted in the figure, the steps and/or operations are associated with step 224 of FIG. 2. A representative scenario is also shown in the figures to illustrate an example of this application activity selection technique 500.

The application activity selection technique 500 commences by receiving an application activity request (step 502). As illustrated, a representative application activity request 522 might be issued from native application $104_1$ in response to user "u1" opening file "f2" in the application. In this case, the representative application activity request 522 is received by an instance of selection service 314 at the content management system that manages file "f2" and native application $104_1$. As can be observed, representative application activity request 522 is a "GET" call to an "app_activity" API endpoint that includes an identifier (e.g., associated with an "objID" request parameter) and type (e.g., associated with an "objType" request parameter) that corresponds to file "f2". Other parameters may be included in the request.

A set of application activity records that correspond to the received application activity request are retrieved (step 504). In the shown scenario, selection service 314 might retrieve from activity records 334 all application activities associated with file "f2" as specified in representative application activity request 522. The resulting set of selected application activity records 534 are then filtered according to various user-specific permissions (step 506). As shown, a permissions service 316 at the content management system can derive certain user-specific permissions from the user attributes 342 codified in user profiles 332 to apply to selected application activity records 534. For example, user attributes 342 might indicate that a particular user does not have preview permissions on a file and thereby cannot view any activities corresponding to that file. As another example, user attributes 342 might be accessed by permissions service 316 to remove from the set of application activity records any records that pertain to any enterprise other than the enterprise of the requesting user (e.g., user "u1").

Certain application-specific permissions filtering may also be applied to the selected set of application activity records (step 508). As earlier described, various user groups that have been defined and associated with certain third-party applications can facilitate such application-specific permissions filtering. Specifically, the user groups of which a particular user is a member identifies the corresponding third-party applications and related application activity that the user can access. As such, permissions service 316 can access a set of group definitions 524 recorded in app registry 338 to filter the selected application activity records 534 for those records that user "u1" is associated with as a group member. As merely one example, the foregoing application-specific filtering would prevent a Slack user from viewing any application activities over private Slack channels other than private channels of which the user is a member, even if the user otherwise has previewer permissions for the content objects associated with the activities. In the case of Slack activities over public channels, no application-specific permissions filtering is applied, and the user will be able to view such activities. Other types and/or levels of permissions filtering are possible.

When the filtering and/or other processing of the selected set of application activity records is complete, the records are marked as associated with the application activity request (step 510). In the shown scenario, a set of filtered application activity records 526 are marked as being associated with representative application activity request 522 issued from native application $104_1$. Details pertaining to techniques for generating application activity streams from such sets of filtered application activity records (e.g., step 226 of FIG. 2) are disclosed as follows.

Figure 6:
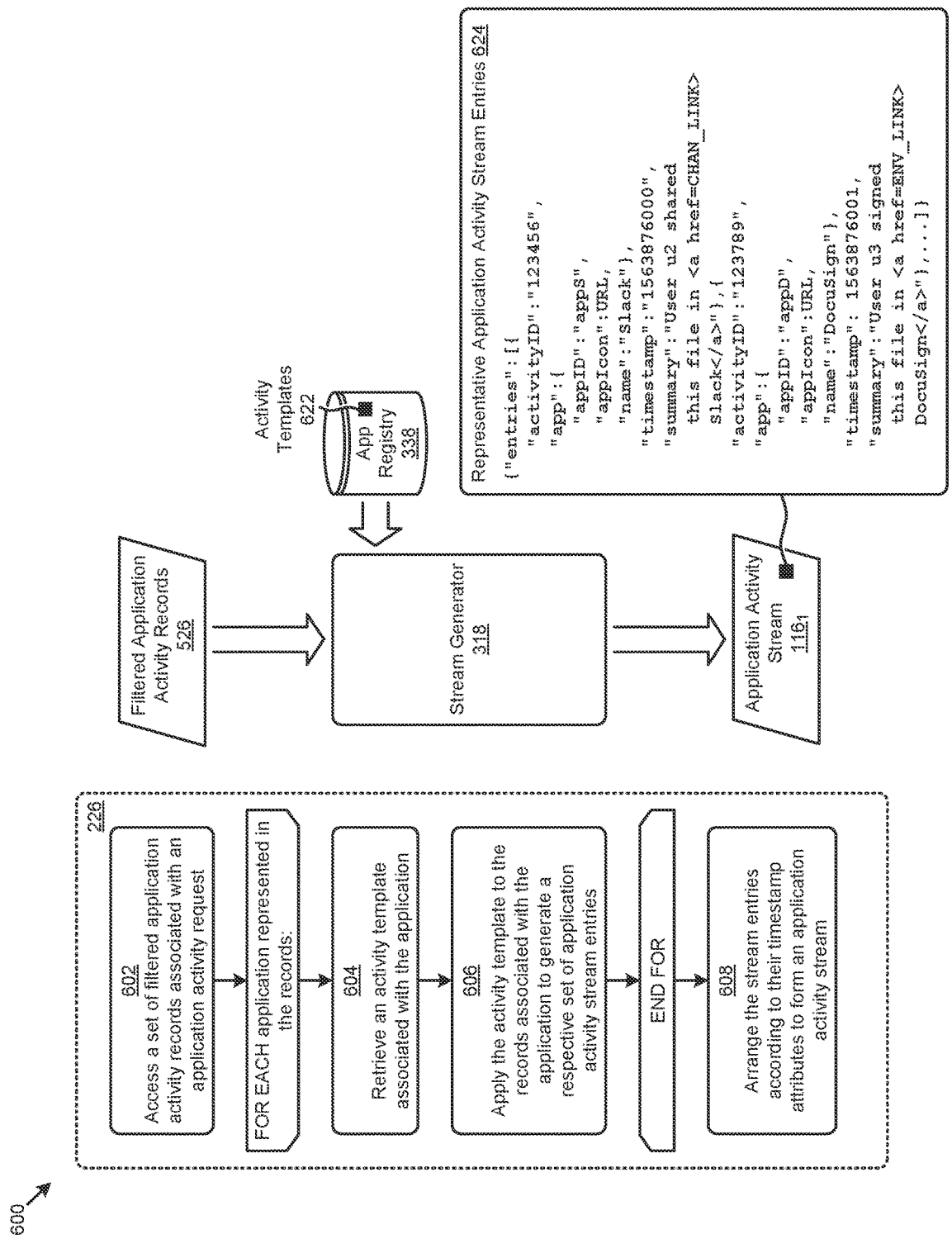
FIG. 6 presents an activity stream generation technique as implemented in systems that facilitate collecting and analyzing collaboration activities performed in heterogeneous applications, according to an embodiment.

FIG. 6 presents an activity stream generation technique 600 as implemented in systems that facilitate collecting and analyzing collaboration activities performed in heterogeneous applications. As an option, one or more variations of activity stream generation technique 600 or any aspect thereof may be implemented in the context of the architecture and functionality of the embodiments described herein. The activity stream generation technique 600 or any aspect thereof may be implemented in any environment.

FIG. 6 illustrates aspects pertaining to implementing application-specific data structures to manage collaboration activity performed at multiple heterogeneous applications in a computing environment. Specifically, the figure is presented to illustrate one embodiment of certain steps and/or operations that facilitate generating application activity streams from sets of application activities performed at third-party applications over content objects managed by a content management system. As depicted in the figure, the steps and/or operations are associated with step 226 of FIG. 2. A representative scenario is also shown in the figures to illustrate an example application of activity stream generation technique 600.

The activity stream generation technique 600 commences by accessing a set of filtered application activity records associated with an application request (step 602). As an example, the set of filtered application activity records might be filtered application activity records 526 associated with an application activity request issued from an instance of a native application provided by the content management system. In this case, filtered application activity records 526 may be selected and/or filtered and/or otherwise processed in accordance with a particular user and/or a particular content object identified in the parameters of the application activity request.

For each third-party application represented in the set of filtered application activity records, an activity template associated with the application is retrieved (step 604). As illustrated, an instance of stream generator 318 might access the filtered application activity records 526 and retrieve from app registry 338 an activity template from a set of activity templates 622 that corresponds to the subject application. The retrieved activity template is applied to the portion of the filtered application activity records that are from the subject application to generate a respective set of application activity stream entries (step 606).

As indicated by a set of representative application activity stream entries 624, each application activity stream entry can be described by an activity identifier (e.g., stored in an "activityID" field), a set of application attributes (e.g., stored in an "app" array), a timestamp associated with the underlying activity (e.g., stored in a "timestamp" field), a human-readable summary of the activity (e.g., stored in a "summary" field), and/or other attributes. As can be observed, the structure of "summary" is derived from a localization portion of an application-specific activity template earlier discussed as pertains to FIG. 3B.

When the application activity stream entries for all of the third-party applications represented in the filtered application activity records 526 have been generated, the entries are arranged according to their timestamp to form an application activity stream (step 608). In the example scenario, application activity stream $116_1$ is formed by stream generator 318 to comprise the representative application activity stream entries 624 and other entries arranged in descending order according to the content of the respective "timestamp" fields of the entries. As such, the application activity stream is prepared to present the most recent activity at the top of the stream. Other attributes and/or criteria may be considered when arranging the entries of an application activity stream.

The foregoing discussions include techniques for presenting application activity streams to various users (e.g., step 228 of FIG. 2), which techniques are disclosed in further detail as follows.

Figure 7:
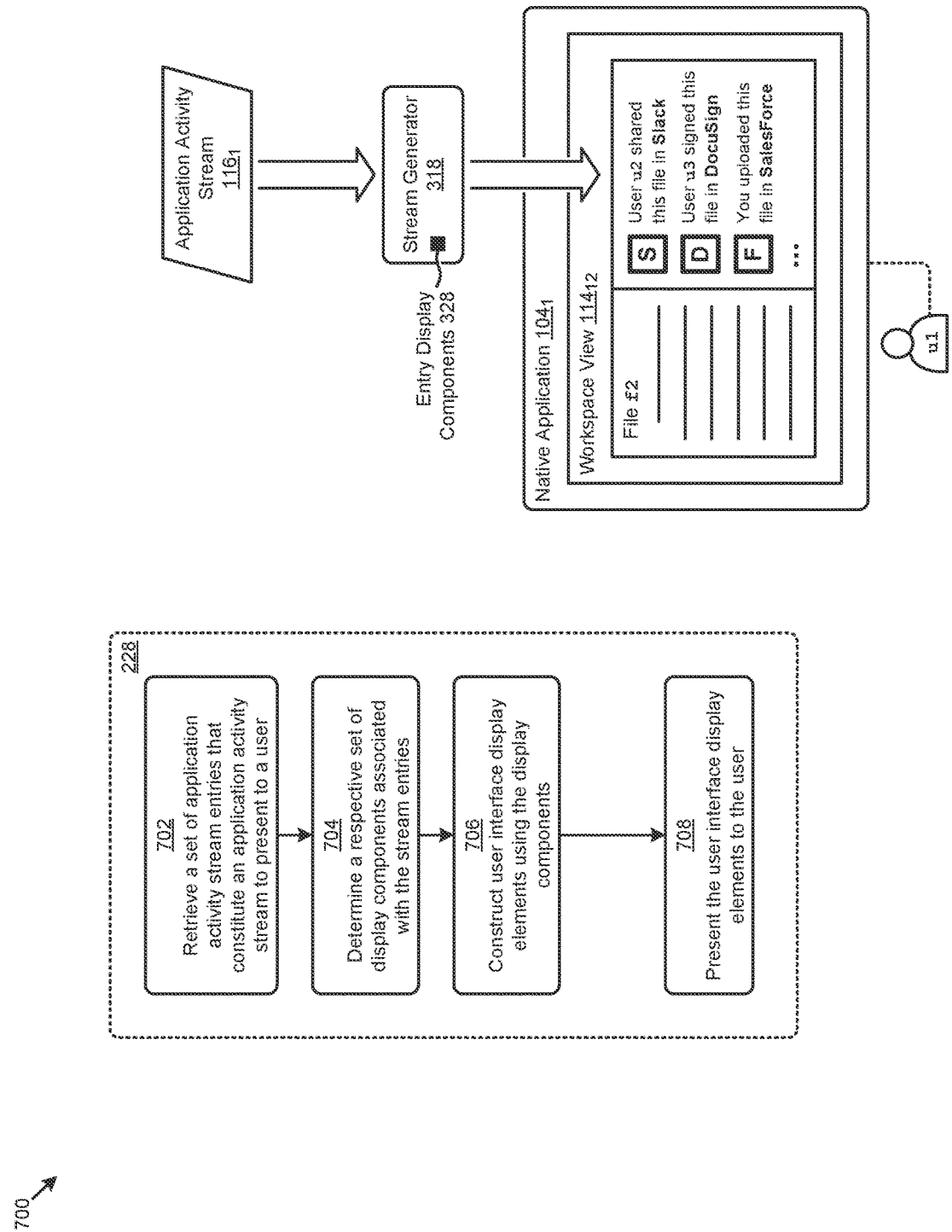
FIG. 7 depicts an activity stream presentation technique as implemented in systems that facilitate collecting and analyzing collaboration activities performed in heterogeneous applications, according to an embodiment.

FIG. 7 depicts an activity stream presentation technique 700 as implemented in systems that facilitate collecting and analyzing collaboration activities performed in heterogeneous applications. As an option, one or more variations of activity stream presentation technique 700 or any aspect thereof may be implemented in the context of the architecture and functionality of the embodiments described herein. The activity stream presentation technique 700 or any aspect thereof may be implemented in any environment.

FIG. 7 illustrates aspects pertaining to implementing application-specific data structures to manage collaboration activity performed at multiple heterogeneous applications in a computing environment. Specifically, the figure is presented to illustrate one embodiment of certain steps and/or operations that facilitate presenting an application activity stream to a user. As depicted in the figure, the steps and/or operations are associated with step 228 of FIG. 2. A representative scenario is also shown in the figures to illustrate an example application of activity stream presentation technique 700.

The activity stream presentation technique 700 commences by retrieving a set of application activity stream entries that constitute an application activity stream to present to a user (step 702). As illustrated, an instance of stream generator 318 might retrieve the application activity stream 116₁ earlier described. Various display components respectively associated with the application activity stream entries are determined (step 704). The entry display components (e.g., app icon, user avatar, activity summary, hyperlinks, etc.) and/or other references to the components are often codified in the constituent data of the application activity stream entries. As merely an illustrative example, entries that correspond to the Slack third-party application are represented by square app icon identified by the capital letter "S", entries that correspond to the DocuSign third-party application are represented by a square app icon identified by the capital letter "D", and entries that correspond to the SalesForce third-party application are represented by a square app icon identified by the capital letter "F".

Certain user interface display elements are constructed from the display components associated with the application activity stream entries (step 706). As an example, stream generator 318 might access a user interface library (e.g., React library) to generate the code for rendering the display components of file "f2" for the application activity stream at a target user interface. The user interface display elements are then presented to the user at the target user interface (step 708). As illustrated, the target user interface might be a workspace view 114₁₂ of native application 104₁ associated with user "u1".

Additional Embodiments of the Disclosure

Additional Practical Application Examples

Figure 8A:
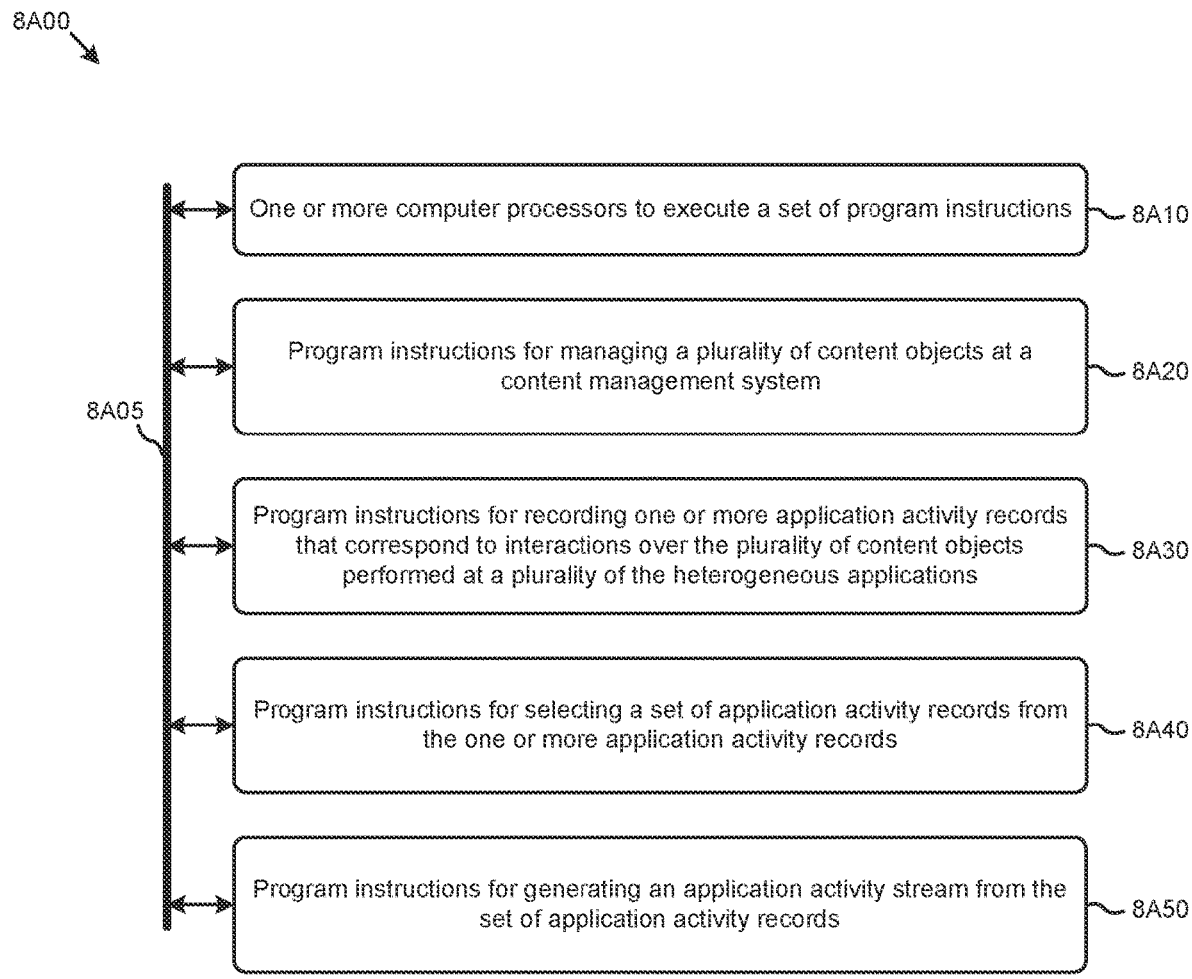
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. This and other embodiments present particular arrangements of elements that, individually or as combined, serve to form improved technological processes that address tracking collaboration activity over numerous heterogeneous applications in a computing environment. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with any other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising one or more computer processors to execute a set of program code instructions (module 8A10) and modules for accessing memory to hold program code instructions to perform: managing a plurality of content objects at a content management system (module 8A20); recording one or more application activity records that correspond to interactions over the plurality of content objects performed at a plurality of the heterogeneous applications (module 8A30); selecting a set of application activity records from the one or more application activity records (module 8A40); and generating an application activity stream from the set of application activity records (module 8A50).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 8B:
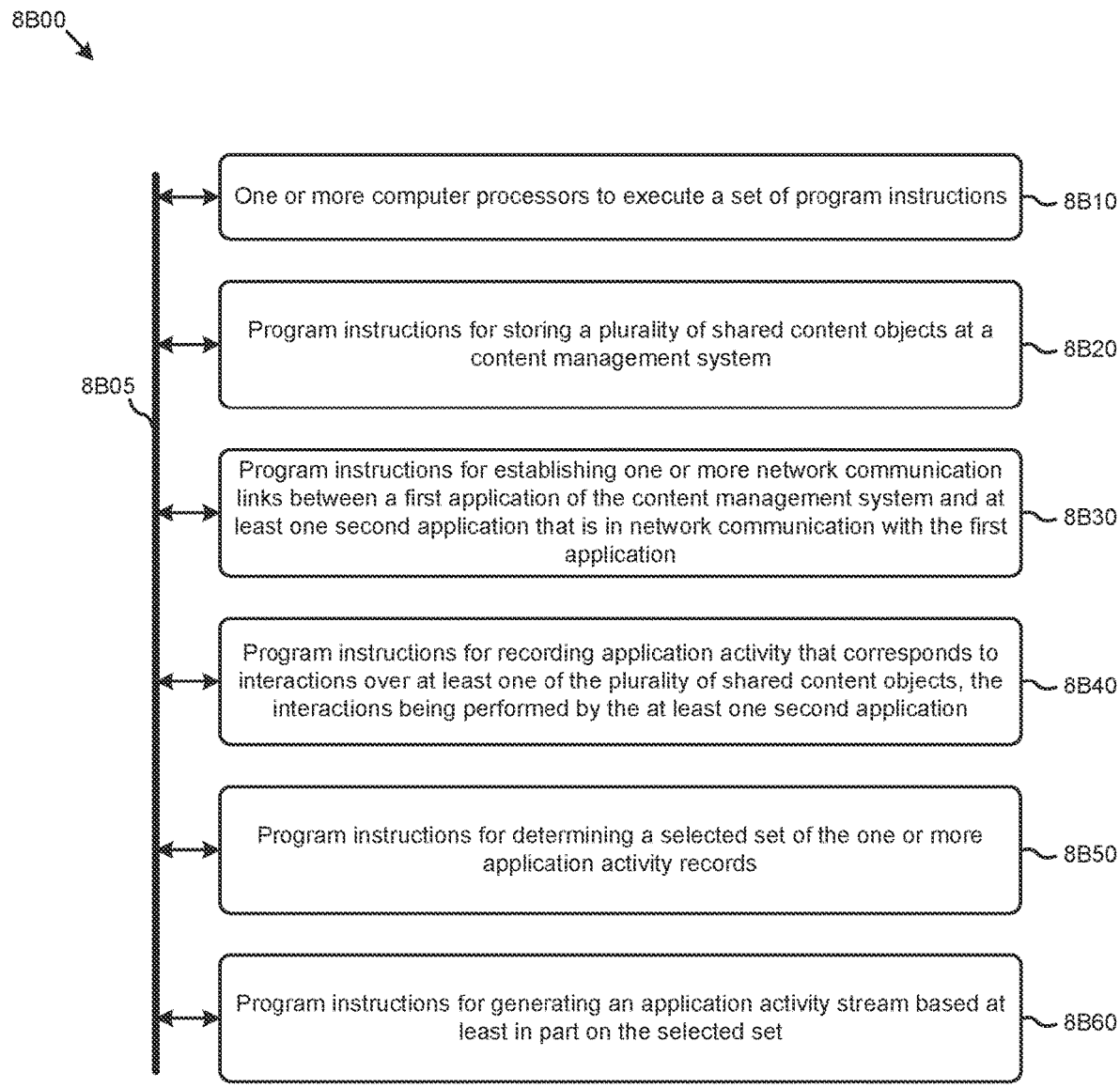

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with any other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising one or more computer processors to execute a set of program code instructions (module 8B10) and modules for accessing memory to hold program code instructions to perform: storing a plurality of shared content objects at a content management system (module 8B20); establishing one or more network communication links between a first application of the content management system and at least one second application that is in network communication with the first application (module 8B30); recording application activity that corresponds to interactions over at least one of the plurality of shared content objects, the interactions being performed by the at least one second application (module 8B40); determining a selected set of the one or more application activity records (module 8B50); and generating an application activity stream based at least in part on the selected set (module 8B60).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

System Architecture Overview

Additional System Architecture Examples

Figure 9A:
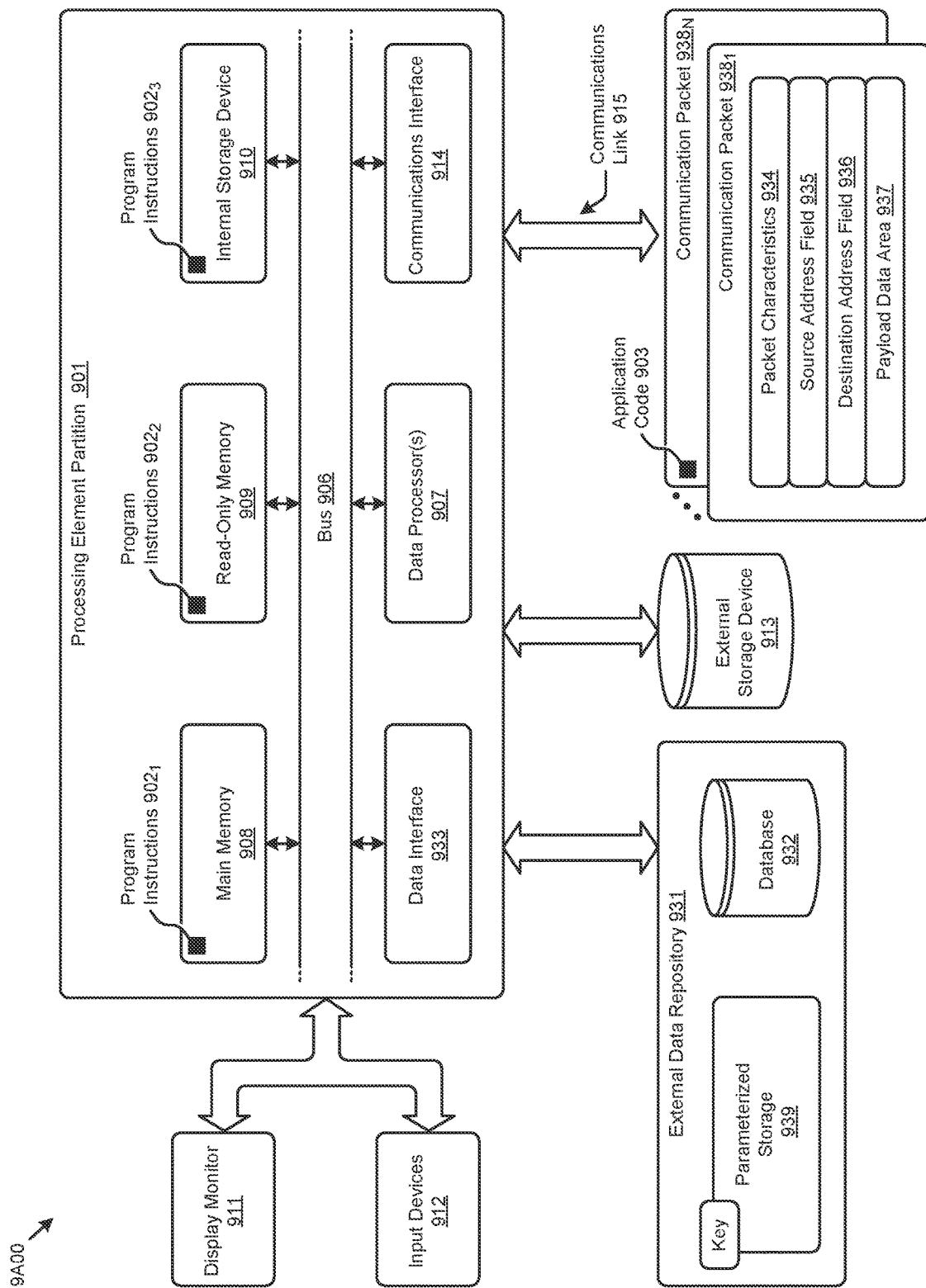
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program instructions contained in a memory. Such instructions (e.g., program instructions $9021$, program instructions $9022$, program instructions $9023$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program instructions may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to collecting and analyzing collaboration activities performed in heterogeneous applications. A module may include one or more state machines and/or combinational logic used to implement or facilitate the operational and/or performance characteristics pertaining to collecting and analyzing collaboration activities performed across heterogeneous applications.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of collecting and analyzing collaboration activities performed in heterogeneous applications). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to collecting and analyzing collaboration activities performed in heterogeneous applications, and/or for improving the way data is manipulated when performing computerized operations pertaining to implementing application-specific data structures to manage collaboration activity performed across multiple heterogeneous applications.

Figure 9B:
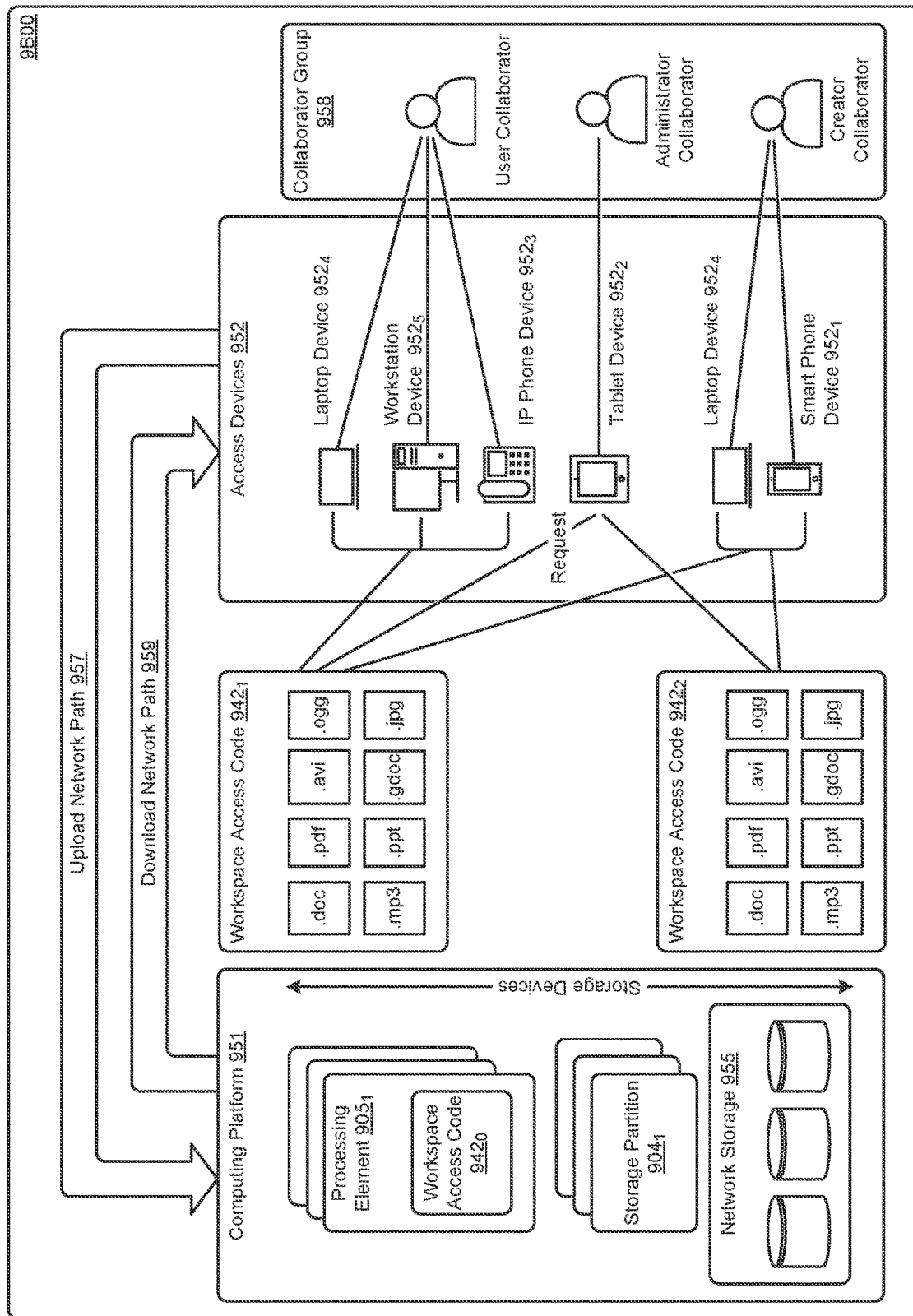

FIG. 9B depicts a block diagram of an instance of a cloud-based environment 9B00. Such a cloud-based environment supports access to workspaces through the execution of workspace access code (e.g., workspace access code 942$_0$, workspace access code 942$_1$, and workspace access code 942$_2$). Workspace access code can be executed on any of access devices 952 (e.g., laptop device 952$_4$, workstation device 952$_5$, IP phone device 952$_3$, tablet device 952$_2$, smart phone device 952$_1$, etc.), and can be configured to access any type of object. Strictly as examples, such objects can be folders or directories or can be files of any filetype. A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 951, including in a middleware setting. As shown, a portion of the workspace access code resides in and can be executed on one or more processing elements (e.g., processing element 905$_1$). The workspace access code can interface with storage devices such as networked storage 955. Storage of workspaces and/or any constituent files or objects, and/or any other code or scripts or data can be stored in any one or more storage partitions (e.g., storage partition 904$_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for forming activity streams across heterogeneous applications, the method comprising:

storing a plurality of shared content objects at a content management system;

establishing one or more network communication links between a first application of the content management system and at least one second application from a plurality of second applications that is in network communication with the first application, wherein a respective application-specific data structure stores application-specific information corresponding to each of the first application or the at least one second application;

recording application activity records that correspond to interactions with at least one of the plurality of shared content objects, the interactions being performed by the at least one second application;

receiving, from a user, a request to access a content object from the plurality of shared content objects;

determining a set of selected application activity records based at least in part on one or more permissions attributes that are application-specific and which are codified in the application-specific data structure, wherein application-specific permissions codified in the application-specific data structure are applied to identify application activity records that should not be provided to the user; and generating an application activity stream based at least in part on the set of selected application activity records.

2. The method of claim 1, wherein the first application is a native application relative to the content management system and the at least one second application is a third party application relative to the content management system.

3. The method of claim 1, wherein the application activities that should not be provided to the user are identified because the application activities pertain to an application that is not accessible to the user.

4. The method of claim 1, wherein additional filtering is further applied to identify the application activities that should not be provided to the user based at least in part on the one or more permission attributes corresponding to at least one of a first attribute pertaining to a specific content object, a second attribute pertaining to a particular interaction or interaction type, or a third attribute corresponding to the user.

5. The method of claim 1, wherein the content management system is provided by a first entity, and the at least one second application comprises multiple heterogeneous applications that are provided by a plurality of entities other than the first entity.

6. The method of claim 1, wherein the respective application-specific data structure is stored in an application registry.

7. A non-transitory computer readable medium having stored thereon a sequence of instructions which, when stored in memory and executed by one or more processors, causes the one or more processors to perform a set of acts for forming activity streams across heterogeneous applications, the set of acts comprising:
    storing a plurality of shared content objects at a content management system;
    establishing one or more network communication links between a first application of the content management system and at least one second application from a plurality of second applications that is in network communication with the first application, wherein a respective application-specific data structure stores application-specific information corresponding to each of the first application or the at least one second application;
    recording application activity records that correspond to interactions with at least one of the plurality of shared content objects, the interactions being performed by the at least one second application;
    receiving, from a user, a request to access a content object from the plurality of shared content objects;
    determining a set of selected application activity records based at least in part on one or more permissions attributes that are application-specific and which are codified in the application-specific data structure, wherein application-specific permissions codified in the application-specific data structure are applied to identify application activity records that should not be provided to the user; and
    generating an application activity stream based at least in part on the set of selected application activity records.

8. The non-transitory computer readable medium of claim 7, wherein the first application is a native application relative to the content management system and the at least one second application is a third party application relative to the content management system.

9. The non-transitory computer readable medium of claim 7, wherein the application activities that should not be provided to the user are identified because the application activities pertain to an application that is not accessible to the user.

10. The non-transitory computer readable medium of claim 7, wherein additional filtering is further applied to identify the application activities that should not be provided to the user based at least in part on the one or more permission attributes corresponding to at least one of a first attribute pertaining to a specific content object, a second attribute pertaining to a particular interaction or interaction type, or a third attribute corresponding to the user.

11. The non-transitory computer readable medium of claim 7, wherein the content management system is provided by a first entity, and the at least one second application comprises multiple heterogeneous applications that are provided by a plurality of entities other than the first entity.

12. The non-transitory computer readable medium of claim 7, wherein the respective application-specific data structure is stored in an application registry.

13. A system for forming activity streams across heterogeneous applications, the system comprising:
    a non-transitory storage medium having stored thereon a sequence of instructions; and
    one or more processors that execute the sequence of instructions, execution of the sequence of instructions causing the one or more processors to perform a set of acts, the set of acts comprising:
    storing a plurality of shared content objects at a content management system;
    establishing one or more network communication links between a first application of the content management system and at least one second from a plurality of second applications application that is in network communication with the first application, wherein a respective application-specific data structure stores application-specific information corresponding to each of the first application or the at least one second application;
    recording application activity records that correspond to interactions with at least one of the plurality of shared content objects, the interactions being performed by the at least one second application;
    receiving, from a user, a request to access a content object from the plurality of shared content objects;
    determining a set of selected application activity records based at least in part on one or more permissions attributes that are application-specific and which are codified in the application-specific data structure, wherein application-specific permissions codified in the application-specific data structure are applied to identify application activity records that should not be provided to the user; and
    generating an application activity stream based at least in part on the set of selected application activity records.

14. The system of claim 13, wherein the first application is a native application relative to the content management system and the at least one second application is a third party application relative to the content management system.

15. The system of claim 13, wherein the application activities that should not be provided to the user are identified because the application activities pertain to an application that is not accessible to the user.

16. The system of claim 13, wherein additional filtering is further applied to identify the application activities that should not be provided to the user based at least in part on the one or more permission attributes corresponding to at least one of a first attribute pertaining to a specific content object, a second attribute pertaining to a particular interaction or interaction type, or a third attribute corresponding to the user.

17. The system of claim 13, wherein the content management system is provided by a first entity, and the at least one second application comprises multiple heterogeneous applications that are provided by a plurality of entities other than the first entity.

\* \* \* \* \*